United States Patent [19]
Oster

[11] Patent Number: 5,950,543
[45] Date of Patent: Sep. 14, 1999

[54] EVACUATED TUBE TRANSPORT

[75] Inventor: Daryl Oster, Crystal River, Fla.

[73] Assignee: et3.com Inc., Crystal River, Fla.

[21] Appl. No.: 08/948,978

[22] Filed: Oct. 10, 1997

[51] Int. Cl.$^6$ ........................................... B61B 13/00
[52] U.S. Cl. ......................... 104/138.1; 104/27; 104/28; 104/130.05
[58] Field of Search .............. 104/138.1, 138.2, 104/130.05, 130.01, 27, 29, 28, 30, 31

[56] References Cited

U.S. PATENT DOCUMENTS

| | | | |
|---|---|---|---|
| 616,255 | 12/1898 | Pike | 104/138.1 |
| 624,202 | 5/1899 | Fordyce | 104/138.1 |
| 3,090,328 | 5/1963 | Berggren | 104/138.1 |
| 3,404,638 | 10/1968 | Edwards | 104/138.1 |
| 3,565,011 | 2/1971 | Edwards | 104/138.1 |
| 3,566,800 | 3/1971 | Chuan | 104/138.1 |
| 3,605,629 | 9/1971 | Edwards | 104/138.1 |
| 3,724,691 | 4/1973 | Carstens et al. | 104/138.1 |
| 3,999,487 | 12/1976 | Valverde | 104/138.1 |
| 5,433,155 | 7/1995 | O'Neill et al. | 104/138.1 |
| 5,460,098 | 10/1995 | Jackson et al. | 104/138.1 |
| 5,513,573 | 5/1996 | Sutton | 104/138.1 |

FOREIGN PATENT DOCUMENTS

| | | | |
|---|---|---|---|
| 4028292 | 3/1992 | Germany | 104/138.1 |
| 1207563 | 10/1970 | United Kingdom | 104/138.1 |

*Primary Examiner*—Mark T. Le

[57] ABSTRACT

An evacuated tube transport (ETT) system comprises: Evacuated tubes (200) along a travel route (100) for both directions; capsules (300) to transport occupants or cargo within the tubes; equipment (700) providing continuous transfer to tube while preserving vacuum; capsule suspension (400) that substantially eliminates drag; coordinated acceleration device (500); energy recovery braking (600); vibration control structures (820); tube alignment devices (230); automatic capsule switch (650) and synchronization (885); automated operation, inspection, and maintenance (810); methods of construction; redundant data (835), safety and security (880) systems. Low and high technology embodiments are comprehensively disclosed. Possibilities include replacement or augmentation of: vehicles, power lines, energy storage devices, power plants, heaters, air conditioning, water and sewer pipes, and communication cables and satellites. ETT provides continuous, environmentally benign, sustainable, local and international travel. Aerodynamic limitations, weather exposure, and obstacles are essentially eliminated; The system enables a quantum improvement in safety, speed and efficiency.

6 Claims, 18 Drawing Sheets

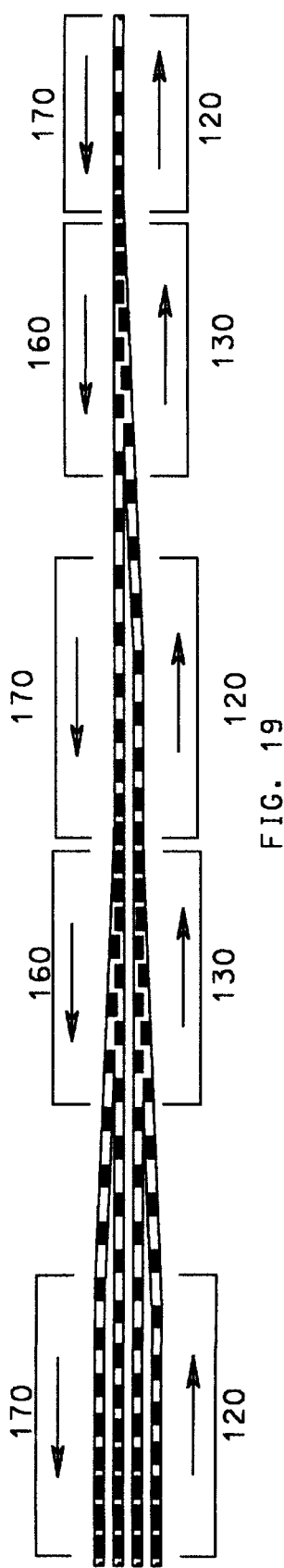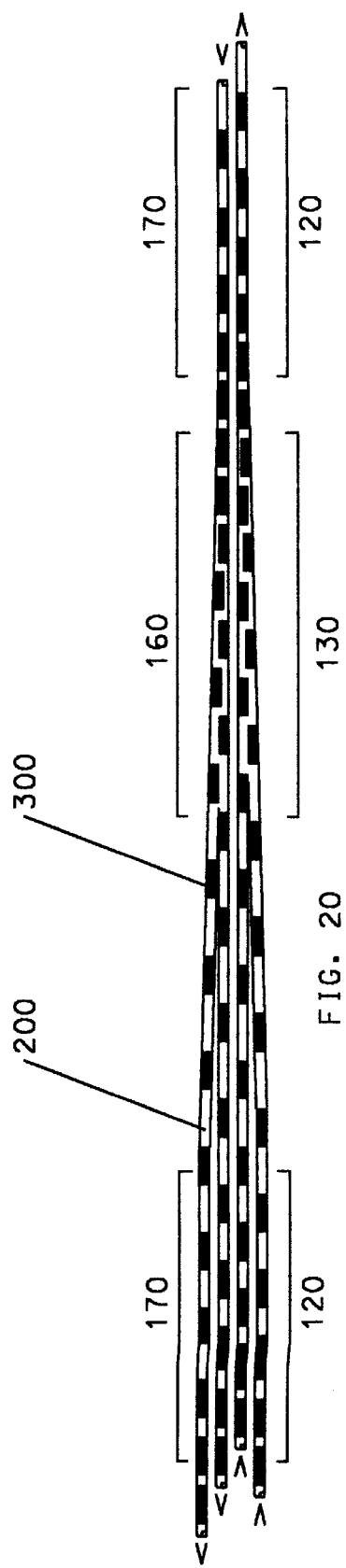

EVACUATED TUBE TRANSPORT

BACKGROUND

1. Field of the Invention

The present invention relates to improvements to efficiency, ecology, safety, and speed of transportation technology.

The transport of persons and cargo is currently handled by the use of: trains; bicycles, cars, trucks, trailers, busses and motorcycles operating on roads, tunnels, bridges and highways; ships, submarines boats and hover-craft in water; and airplanes, rotor-craft, dirigibles, rockets, and balloons in the air. Pipelines carry liquids and gasses. Aluminum or copper conductors transport electrical power.

Energy Requirements of Classic Transport Methods:

The minimum energy required to accelerate an object to a given speed is $E=(M/2)*V*V$. All of this energy is retained by the object in the form of kinetic energy unless it is lost through energy transfer such as: 1) external energy reduction due to collisions with another object or travel through a opposing force field, 2) internal energy usage such as heating due to hysteresis or shearing forces (rolling elements and brakes), 3) internal or external energy usage or storage. These well-known losses are primarily:

Aerodynamic drag (or hydrodynamic) $D=A*Cd*Q$, D is the drag. A is the frontal area of the object. Cd is the drag coefficient of the object and Q is the dynamic pressure equal to the one half the density of the fluid times the velocity squared. This equation is a close approximate for incompressible ideal fluids. The actual drag experienced is worse than the equation predicts because of viscosity and compressibility of air. At high speed (the speed of sound) the flow of air undergoes a transition to compressed flow. Objects traveling faster than the speed of sound experience far greater drag losses, and large amounts of heat are generated in the object by the shock wave. The top speed if an object traveling through air is mostly determined by aerodynamic forces. For the average car or truck half of the resistance is aerodynamic at a speed of 60 MPH. At 120 MPH the aerodynamic resistance increases to ¾ of the total. Aerodynamic resistance and heating is the main obstacle to high speed travel. A car or jet airplane consumes vast quantities of fuel just to push the air (and sound waves) aside for passage. Air continually blocks travel and must be moved every step of the way draining kinetic energy from the traveling object.

Much effort has gone into reducing aerodynamic drag of aircraft and cars. The methods of this drag reduction have been to: reduce to a minimum the frontal area, the wetted area, and the drag coefficient of the body traveling through the air. Aircraft reduce drag by flying at high altitudes where the air is less dense, however engine power is also reduced. Expensive wind tunnels, or super computers are necessary tools for reduction of drag by classic methods.

Rolling resistance is more or less constant, so power absorbed varies linearly with speed. At the top speed of most vehicles rolling resistance is a small percentage of the total resistance. It is however a major obstacle to high speed travel. After aerodynamic forces rolling resistance is the next biggest obstacle to high speed travel. Drag of rolling elements is reduced by using large diameter thin, hard wheels rolling on a hard smooth surface. At high speed the centrifugal forces generated in rolling elements become extreme. Heat builds in bearings, tires, and wheels faster than it can dissipate. The limiting factor to higher speed becomes the strength of the materials, and heat buildup. Rolling elements have been used up to about 650 mph. Sustainable maximum safe speed using rolling elements is about 300 MPH. Rolling resistance is mainly due to the flexibility (hysteresis losses) of contacting elements like tires. Flexibility of rolling elements is minimized on trains. To minimize rolling resistance ride quality and rough road tolerance is compromised.

Internal friction of engine and power transmissions, while small compared to the total power produced are a significant factor and represent vast quantities of lost energy. Internal friction is present any time contacting surfaces move relative to one another. Another cause of internal resistance is the hydrodynamic shearing of lubricating and working fluids used in bearings to reduce friction. Pipe lines that carry fluids and gasses are limited in their capacity by internal friction of the fluid, and friction with the side wall of the pipe. Pressure is required to overcome losses and move a fluid through a pipe. The pressure required is dependent on the length and diameter of the pipe, the amount of flow, and the viscosity of the fluid. When the pressure required to force flow exceeds the pressure rating of the pipe, the pipe may burst. The electrical resistance of a conductor is proportional to its length. The amount of current that a wire can carry is proportional to the area of the diameter. Voltage potential is used to overcome resistance of the wire to move current. The voltage drop caused by resistance along the length of the wire is an energy loss. The lost energy is in the form of heat. Heat buildup limits the power transfer potential of a wire, if the current exceeds the rating the wire may melt or burn.

Only a small percentage of the energy that a plane or car uses is actually used to accelerate the vehicle. None of this energy is recovered when deceleration takes place, it is dissipated in the form of heat and sound as the speed is reduced.

It is well known that space craft in outer space travel with virtually no drag; the speed is limited only by energy requirements. Once a spacecraft is up to speed it can coast for years at ultra high speed using no energy for propulsion. The fuel required to get a space vehicle into orbit weighs many times more than the vehicle. None of the energy used is recovered during re-entry. Heating due to high velocity re-entry through the atmosphere is a major problem.

Safety of Classic Transport:

Much of the population of developed countries use the automobile in day to day life. Automobile accidents account for the majority of accidental deaths of all persons below the age of 75, and is the leading cause of death of people from the age 15 to 45. In the U.S. 1992 there were 31.8 million motor vehicle accidents, 39,200 died and 5.4 million were injured. Of the deaths 10.8% were non collision, 44.6% involved another motor vehicle, 16.7% a pedestrian, 27.9% a fixed object. There where 592 railway deaths, 120 airline deaths, 812 general aviation deaths, 816 recreational boating deaths, 85 commercial water deaths. The death rate per billion miles is 18 for motor vehicle, 1.3 airline, 50 for general aviation, 1.1 for train. The per billion mile death rates are slowly declining due to increasing safety measures. The per billion mile death rate for type of road: 12 urban, 26 rural, 9 interstate (6 urban, 12 rural) and 20 non interstate (14 urban, 30 rural). Many people die annually as a result of electrical shock from exposed power conductors.

Terrorist favor aircraft as a target to hijack because of the number of captive hostages. An airplane can be directed to a new destination thus providing an ideal getaway vehicle. The Automobile is often the target of criminal hijacking because of minimal security on roads and streets and the ability to elude detection (and apprehension if detected).

Speed of Classic Transport:

The current typical speeds of travel for different methods are as follows: ship 30 MPH, motor vehicle 75 MPH, fast train 200 MPH, general aviation 350 MPH, airline 600 MPH, super sonic transport 1700 MPH, space craft 18000 MPH. The speed potential of most types of travel is less than the maximums indicated because of safety needs, delays, lack of continuous service, and weather conditions.

Cost of Classic Transport:

The typical per mile cost of transport is as follows: ship 5, pleasure boat 200 c, automobile 45 c, bus 10 c, private airplane 90 c, train 15 c, airline 15 c, SST 45 c, Toll road 5 to 10 c. Total US transportation outlays for 1992 amounted to $996 billion. Freeway cost is approximately $2.5 million per mile, high speed train and rail (200 mph) $15 million per mile. The cost of a major airport is over a billion dollars. The greater the capacity of a vehicle the greater the likely hood that the full capacity cannot be fully used. If an airplane or ship is scheduled but only ⅓ full, it must honor the commitment or cancel the service, either loosing money or upsetting customers. The total economic loss due to accidents in '92 was 98.1 billion dollars. Theft and vandalism represent a large percentage of the cost of transportation losses. The environmental impact is a cost that is difficult to quantify, but clearly the automobile is a leading cause of air pollution.

Disadvantages of Classic Transport:

Land vehicles operating on roads have the following disadvantages: at the mercy of wind, rain, darkness, snow, hail, frost, and ice; rely on roads subject to wear, damage, ruts, frost heaving, washouts, potholes, mud, and rock slides; continual danger of collision with stationary or moving objects; mechanical failures including flat tires, out of gas, headlight failure, sudden catastrophic failures, and dead batteries; high maintenance cost; short life; and reliance on continual operator vigilance and skill. Trains operating on rails are subject to derailment, brake failure, track damage, objects on the track, and reduced traction in wet or icy weather. Continuos service is impractical for trains. Span loading for road and rail bridges are very high, leading to high cost.

Marine vehicles have the following disadvantages: at the mercy of wind, rain, darkness, snow, hail, frost, and ice; danger from wave action, tides and currents; Continual danger of collision with stationary or moving objects; mechanical failures including, out of fuel, leaks, engine failure, and dead batteries; danger of sinking, and drowning; high maintenance cost; short life; and reliance on operator vigilance and skill.

Aircraft have the following disadvantages: at the mercy of weather; rely on a place to land (airport) subject to wear, damage, ruts, frost heaving, washouts, potholes, and mud; Continual danger of collision with stationary or moving objects; mechanical failures including engine outage, out of fuel, sudden catastrophic failures, and radio interference; high maintenance cost; short life; and reliance on exceptional operator vigilance and skill. A collision with a single bird can cause a jumbo jet to crash.

Most transport vehicles use internal combustion engines that cause air, water, and noise pollution. Despite the disadvantages and high cost of classic transport methods, they are very widely used. Transport accounts for over 10 percent of the worlds gross product, and is growing at twice the rate. This is testament to human desire and need for transportation.

Water, oil, sewage, natural gas and other liquids and gasses are often transported by pipelines. The capacity of a pipeline is limited by the size of the pipe and the pressure available to overcome the frictional losses of the fluid. The power required varies in direct proportion with the length of the pipe. Very long pipes require many pumping stations along the pipe to overcome losses. Heat loss in long pipes prevent use to transport heat over long distances.

Electric power transport lines transport electricity from production facilities to end users. The voltage available along the line drops proportionally to the distance from the source. The voltage drop is a great power loss. The extreme voltage required to move electric energy long distances is dangerous. High towers and wide rite of ways are required to maintain safe distances from the high voltage. Sub stations are needed to reduce the voltage to lower levels for distribution. Ice and wind loads often down lines and cause fires due to arcing. High tension power lines are not compatible with road traffic because of the danger of a line tower being struck by a stray vehicle. There is much room for improvement involving classic transport; however major rethinking is required if great gains are desired.

2. Prior Art Relating to the Invention

Conveying systems that use an air pump to reduce the air pressure in front of a capsule to transport documents and money are in common use (Lang U.S. Pat. No. 5,234,292 August 1993; Podoll—Jensen U.S. Pat. No. 4,715,750 December 1987). These Pneumatic tubes are only efficient for light loads (under 5 lb.), low speed, and distance under 5 miles. A great percentage of the energy losses are due to the friction of the air moving through the tube.

Many patents disclose the use of magnetic energy to levitate a body for transport thus eliminating speed limitations caused by rolling elements (Tozoni U.S. Pat. Nos. 5,319,275 June 1994; Quaas 5,291,834 March 1994; Alcon 5,319,336 June 1994; Berdut 5,452,663; etc.). Maglev technologies are varied in complexity and efficiency. These systems do not address the substantial elimination of aerodynamic drag, or eliminate the possibility of collisions, or provide isolation from weather.

Conveying systems used in the electronics industry utilize magnetic levitation and high vacuum to reduce the possibility of contamination of parts and materials requiring dust free environments for production (Kawada et al. U.S. Pat. No. 5,309,049 May 1994). This system is unusable for high speed continuous transport, because intermittent motion is required. The efficiency is low.

A few patents disclose transportation systems using evacuated tubes to reduce or substantially eliminate aerodynamic drag. These systems have not been practical for one reason or another. Minovitch U.S. Pat. Nos. 3,954,064; 4,075,948; and 4,148,260 discloses a gravity powered system that requires a tunnel several thousand feet into the earth. While highly efficient, the system is impractical from many standpoints: it is highly stressed and requires exotic materials to build. It is susceptible to flooding. It is susceptible to geologic shifts of the earth. The alignment means are not automatic. The speed attainable is dependent on great depth or complex, heavy flywheel energy storage. The inertial load of the vehicle is not allowed for. Vibration and swaying loads are ignored. For great depths under the earth the temperature and heat flux is so great that the entire diameter of the tube would be taken by cooling water and steam escape. Sutton U.S. Pat. No. 5,513,573 is even less practical than Minovitch, as the pressure at 100 miles depth would crush a tube formed of any known material let alone solidified rock.

The system disclosed by O'neil et al. U.S. Pat. No. 5,433,155. discloses precise control and locating of trains of vehicles. The system relies on electrical energy and computer control to suspend the vehicle. A conductor is used between the vehicle and the tube. A computer failure could result in sudden suspension failure. No provision exists for active alignment of the tube.

The system disclosed by Goddard U.S. Pat. No. 2,511,979 requires large amounts of mercury which is toxic.

The vacuum highway seal (lock) disclosed by Milligan U.S. Pat. No. 5,435,253 is impractical. The high vapor pressure of water at non freezing temperatures would cause high drag. If a low vapor pressure liquid such as mercury where used, special means of containment and handling would be involved to negate the toxic nature and environmental hazard. Additionally the inventor has not done sufficient and accurate calculations. The lack of technical rigor is evidenced by the statement that "the vacuum tube would have to be restrained from floating away", this is not valid because a structure capable of withstanding a vacuum would be to heavy to float off by reason of the buoyancy in air unless constructed of exotic, delicate materials unfit for the intended purpose.

There have been a few patents issued on evacuated tubes with magnetic suspension and linear motor accelerators used to accelerate a space craft to orbital or escape velocity (Minovitch U.S. Pat. Nos. 4,791,850; 4,795,113 and Marks et al. U.S. Pat. No. 4,881,446). These systems are not usable as a mass transport system, and the acceleration energy is not recovered.

Most of these systems are batch type of systems severely limiting the capacity. The vehicle handling and terminals are not disclosed to the point of a viable mass transport system. None of the systems disclosing evacuated tubes sufficiently disclose the operation of the terminal and tube to allow high volumes of continuous traffic at high speeds. Despite the advantages of these transport systems, their incomplete execution, lack of technical accuracy, and impractical design have relegated them to obscurity. They represent forward thinking, but improvement is required to achieve practicality.

Super conductor technology offers large efficiency gains and is now cost effective in limited fields. Non super conducting linear motors have demonstrated efficiencies over 95%, thus super conductors offer at best a 5% improvement of energy utilization, at great cost. High power superconductor motors have been tested with favorable results and are nearing commercial use. Many levitation technologies depend upon the development of cost effective super conductors.

Electric power generation from nuclear or fossil fuel energy sources accounts for most of the worlds electric generation capacity. Most power plants only convert 30 to 40 percent of the energy consumed into usable electric power. The remaining 60 to 70 percent is wasted and contributes to thermal pollution.

Regenerative breaking is not a new concept. It is used in electric cars to help recharge the batteries while decelerating. In classic transport the amount of energy required to accelerate an object is small compared to the non recoverable losses. It made little sense to expend money on regenerative breaking unless the power transmission means also provided for regenerative breaking. Some electrified railway trains use regenerative breaking. The energy saved is small compared to that lost due to aerodynamic and rolling losses. Danger of electrical shock is a problem due to exposed conductors.

Airlock technology is well developed in fields such as; astronautics, sub-marine, manufacturing, etc. Those well versed in the art have developed safe efficient methods of transferring persons or goods between differing pressures and atmospheres. It will be readily apparent to those versed in the art the special requirements for the airlock means used by the present invention.

Linear motor propulsors are a highly developed field (Sink U.S. Pat. No. 5,497,038), many types exist. Electromagnetic rail gun and satellite launching technology has been initially tested with favorable results. Sandia National Laboratories has developed SERAPHIM (Cowan, et al. U.S. Pat. No. 5,552,649) using this technology to power fast trains (300 mph). Linear projectile accelerators have been demonstrated that can accelerate an object to a speed of 2 kilometers per second, it is estimated by those versed in the art that speeds of 6–8 km/sec. are possible with technology now under development. Aerodynamic drag, rolling resistance, and heating are not addressed by this technology; they are the biggest barrier to higher speeds.

Atomic particle accelerators are in use that accelerate a particle or group of particles to extremely high velocity in an evacuated environment. Electromagnetic means are used to suspend and accelerate the atomic particles. The speed of the particles is measured as a percentage of the speed of light. Atomic particle accelerators are incapable of suspending, accelerating or transporting a payload of any size to be of use as a commercial transport device.

Automatic people conveying systems are in common use. At amusement parks like Disney World the art has advanced to a high degree. These systems are optimized for low speeds. They are reliable and exhibit high continuous usage.

The Romans constructed massive aqua ducts to carry water and sewage. Many still stand and work, after 2000 years. They tunneled through mountains and built over valleys with only human and animal power, and crude measuring devices. Tunneling, road, rail, bridge, and pipeline construction techniques have advance to a high degree, but fail to address the special requirements of travel at speeds measured in miles per second vs. miles per hour.

Continuous pipe making machines are used to make fiberglass reinforced plastic pipe for the transport of fluids. The machines are not used on site so the pipe must be cut to length in the plant and rejoined in the field to construct a pipeline. This cutting and refitting wastes time, requires additional parts, and results in a greater likelihood of leaking.

Many methods of load and position sensing are available to efficiently make continuous accurate measurements at very low cost and energy expenditure. Radar, imaging, GPS, LASER, optical microprocessors, and electronic controllers are well developed technologies. Many schemes at traffic control utilizing these devices have been disclosed. These schemes are capable of increasing existing road capacity, reducing accidents, and increasing safe speed of classic transport a limited amount. They do not provide a substantial elimination of accidental collisions, only a reduction.

Lasers can be used to transmit data at rates exceeding 10 Gbites/sec. Atmospheric conditions limit the usable range for communication use. Dust, fog, and rain scatter the signal.

Life support systems using air quality and temperature monitoring and maintaining equipment are well established. Nuclear submarines and space craft rely on these systems for months at a time. Air re-breathers using similar technology are used by divers. The systems are expensive due to low volume manufacture, and lack of standardization.

None of the prior art utilize positive air and obstacle exclusion from the path of transport to reduce or eliminate aerodynamic drag and increase safety of travel, while allowing efficient continuous loading and unloading of persons and cargo. Because of aerodynamic drag and heating many advanced technologies cannot be fully exploited by the transportation industry. The extra cost of these technologies cannot be justified unless their quantum improvement potentials can be realized.

Objects and Advantages:

The present invention seeks to exploit many advantages of the listed prior art transportation technologies, while eliminating many of the disadvantages. Eliminated are: most causes of accidents, aerodynamic limitations, pollution, vulnerability to the elements, schedules, flammable fuel hazards, resource waste, energy waste, noise, operator skill requirements, wild life barriers, hijacking's, theft, and environmental damage. The present invention also seeks to use advantages of the invention to take the place of: water and sewer lines, electric transmission lines, water heaters, communications cables, communications satellites, and roads.

To maximize safety, and efficiency of travel along a planned path from point A to point B we need the following: 1) Assurance that all obstacles either are moved off of the path or will move off of the path before passage. 2) Assurance of staying on the intended path. 3) A means of accelerating from point A and decelerating to point B., 4) A means of storing or using the energy liberated upon deceleration. 5) means of safe and orderly boarding and disembarking from the path.

The present invention addresses these special needs by unique combinations of known technologies. An Evacuated Tube Transport system (ETT) solves many problems associated with classic transport by moving all obstacles from the path of travel and not allowing their return. Once the path is evacuated and free from obstacles, travel can take place unimpeded. The object traveling (in this case a capsule) is in a tube so it stays on the intended path and no obstacles can get on the path. If subsequent capsules undergo identical acceleration and deceleration, many capsules can travel the same direction in the tube at once with complete safety. Acceleration and deceleration are planned to prevent the capsule from becoming a obstacle to subsequent capsules. The reliability of the capsules is very high due to minimal or no reliance on moving parts. Most of the energy required to accelerate is recovered during deceleration. Means are provided to remove the capsules from the end of the tube or to provide space for successive capsules. Passive or active tube alignment systems keep operation smooth.

The present invention (ETT) eliminates virtually all aerodynamic drag. Current technology that minimizes or eliminates rolling resistance, hysteresis losses, and drag due to suspension, acceleration, and deceleration are exploited. ETT insures that conditions are maintained that allow safe continuous, uninterrupted flow of passengers or cargo. ETT verses classic transport offers: I) greatly increased speed for a given cost or safety level. II) Drastically reduced cost and increased safety for a given speed.

ETT can be used to transport electrical power, water, sewer, oil, gases, and used to extend the overall energy usage of existing power plants.

Challenges of ETT are mainly economic, or related to travel at ultra high speed or in an evacuated environment, they include: High capital requirements with long amortization periods (for a given speed cost can be less). As with roads and tracks, the speed potential is limited by economic considerations over difficult topography, however for a given cost and capacity speed potential is much greater than other forms of ground transport. At hyper velocities any malfunction of seals or compromise of the integrity of the tube could destroy capsules because of extreme kinetic energy, thus security of the tube gains importance as speed increases. Reliance on life support systems is a small price to pay for the many advantages produced by an evacuated environment. Once the trip has started there is no stopping or turning back (unless an emergency occurs) so human needs must be taken into consideration according to the length of the trip. Congestion at busy terminals can be minimized by limiting inflow to the capacity of the system. Some passengers may experience claustrophobia, this can be mitigated by drugs, or preferably, suitable sensory stimulation. Prolonged accelerations can cause discomfort, proper seat design can reduce this. An earth quake, mud slide, flash flood or tidal wave could damage the tube killing many of the occupants and releasing tremendous destructive energy; prudent design precautions mitigate this as known to those versed is the construction and civil engineering arts. Geological movements of the earth are mitigated by an alignment system. Failure of one of the capsules could cause the failure of many, so reliability is paramount. Failure of the braking system could result in the destruction of the terminal and all occupants of the tube, redundant systems prevent this. The challenges are surmountable, as taught by the present invention, as will become apparent to those versed in the arts upon examination of this document.

Advantages of ETT over traditional transportation methods are many; safety, efficiency, speed, convenience and ecology are the main advantages.

Safety: Potential for destruction varies as the square of velocity and linearly with mass. For a given speed the object with lighter mass is the safer. The ETT system minimizes moving mass, thus safety is greater. ETT Enables hyper velocities, hence more potential for destruction exists due to that velocity. For any given speed over about 20 mph and distances over about 10 miles ETT is the safest method of travel. Safer than walking because while in the tube it is improbable to be hit by a motor vehicle, bullet or bolt of lightning. Safer than motor vehicles because the path of travel is always under control; no collisions with a fixed object or another motor vehicle, less mechanical failure to worry about, not subject to adverse weather. Safer than trains because most train accidents are caused by something on or wrong with the track, this is virtually impossible with ETT. Safer than marine travel because of no weather exposure, and collision elimination. Safer than flying because most plane crashes are due to; bad weather, human error, or mechanical failure, all of which are drastically reduced by ETT. Impossible for children, pets, or animals to wander into the way to be run over. No fuel is carried and the materials used can be fire resistant. The major causes of accidents of classic transport have been either eliminated or drastically reduced by ETT.

Efficiency: ETT is the most cost efficient method of travel between two points on earth for traffic volume over aproximatly 12000 vehicles per day and distances over about 10 miles. At a given speed the energy usage is the lowest possible. The operating life is longer and wear and tear less than other forms of transportation, hence longer amortization is possible. Few moving parts to wear out. For a given capacity in persons per hour, the dead and live loads for a ETT bridge or span is much lower than rail or road, leading to lower costs. The separate technologies needed for the implementation of the system are already in use and well proven. The ETT does not rely on super conductor technology, but greater, capacity and efficiency are possible when superconductors become cost effective. ETT can use electricity that can be derived from renewable sources. Most of the materials used are low cost and can be recycled. Existing manufacturing capacity and methods can be used, lowering cost. Worn out roads that need replacing anyway are an ideal location for ETT. Many identical components results in economies of production. Low speed ETT systems require much less right of way because the path of travel is protected, this results in greater land use efficiency, and lower construction and maintenance cost. ETT is compatible with many existing right of ways. ETT can increase the energy conversion efficiency of an existing power plant from 30% to 40% to as much as 80% by making waste heat available to sell. ETT can augment existing communications systems for low additional cost. ETT can replace existing water and sewer pipes, offsetting some cost of construction. ETT can move ice from cold climates to hot climates to supply fresh water and refrigeration, (or waste heat to cold locations).

The energy usage of the ETT is the energy required to:

A) Evacuate the tube. At a minimum equal to $A*P*L$ where A is the area of the cross section, P is the atmospheric pressure, L is the length of the tube (for a tube 4.5 foot dia., at standard conditions is 178 million ft. lb. per mile).

B) Evacuate any leakage.

C) Operate terminal and accessory equipment, removal of excess heat, life support system service requirements.

D) Overcome suspension hysteresis, acceleration/deceleration losses, power transmission and conversion losses, and eddy current losses. The total powering loss is estimated at 5 to 10 percent of the maximum kinetic energy of the capsules. (For a 3000 lb. loaded capsule at v=1 mi/sec total kinetic energy is 1.3 billion ft. lb. per capsule.)

E) Overcome the slight aerodynamic drag from residual gasses still in the tube. The aerodynamic drag varies with air density. A easily achieved vacuum is 0.1 Tohr, the drag reduction at this vacuum is around 5,000 to 1. A medium vacuum is one thousandth of that, or 5,000,000 to 1, a high vacuum is one thousandth of that or just 0.000000002 of the drag at one atmosphere of pressure (outer space is about one hundred thousandth of that).

F) Make up the potential energy difference between arrival and departure altitude. This can result in a net gain if the departure is higher than the destination.

For a given speed and for long distances the energy used per person or ton is less than one percent of the most efficient form of classic transport (99%+energy savings).

Speed: ETT is the fastest possible method of travel between two points on earth greater than 2 miles apart (until star trek becomes a reality). The speed is limited by human limits of acceleration tolerance, this can be minimized with fluid immersion if still greater speed is needed. The curvature of the tube determines the acceleration due to centripetal motion. Thus the speed is limited by the minimum radius to be traveled. For a straight tube the limit to top speed is determined by the linear acceleration that can be produced and the distance. As speed increases so do the energy requirements to maintain the maximum acceleration that a occupant can tolerate. The maximum speed is limited by waste heat build up in the capsule, and the amount of power that the acceleration device is rated for.

Ecology: If renewable, non fossil electricity is used the ETT is non polluting, yielding lower environmental costs. ETT is ideally suited to non polluting energy sources like; wind turbine, solar, hydroelectric. ETT can be used to transport energy, thus reducing the need for electric power transmission lines. Extremely long useful life minimizes the waste of materials associated with other forms of transport. The ETT is quiet. The impact to the environment is minimal compared to a road that animals can't cross without danger. Minimal storm water runoff impact. ETT is more than 100 times less disruptive to wet lands than a road or airport. ETT utilization results in a sustainable world transport system.

Other advantages: Virtually continuous, non-intermittent operation results in no scheduling required. No advance booking or ticket needed. Not dependent on good weather. No storm delays. Travel from any city, to any city on earth within 4 hours (after the system is built). No driver license required. Minimal training required. No fueling required. No odors or fumes produced. Huge existing market, with favorable demand trends toward faster and more efficient travel. Low market dependence, since the need of transport is basic. Servicing and operation can be automated. Light weight simplifies repair and construction. Convenience and social interaction enhanced by mechanization. Can use existing production facilities with minimal tooling cost. Obsolescence unlikely. Can use travel imbalances to transport waste. Less reliance on oil resulting in cheap plastics. Low risk proof of concept for non-life support versions can minimize initial product liability. Aerodynamic instabilities and supersonic heating are virtually eliminated.

ETT does not rely on, or improve directly upon superconductor technology. It is believed that superconductor technology will advance much faster as a result of ETT utilization. ETT can fully exploit the advantages of super conductors. There will be much more incentive to develop cost effective superconductors when ETT becomes utilized.

BRIEF DESCRIPTION OF THE DRAWINGS

FIGS. 19–20—schematic views of multiple tube arrangements at switching or merge areas.

SUMMARY OF THE INVENTION

Figure 1:
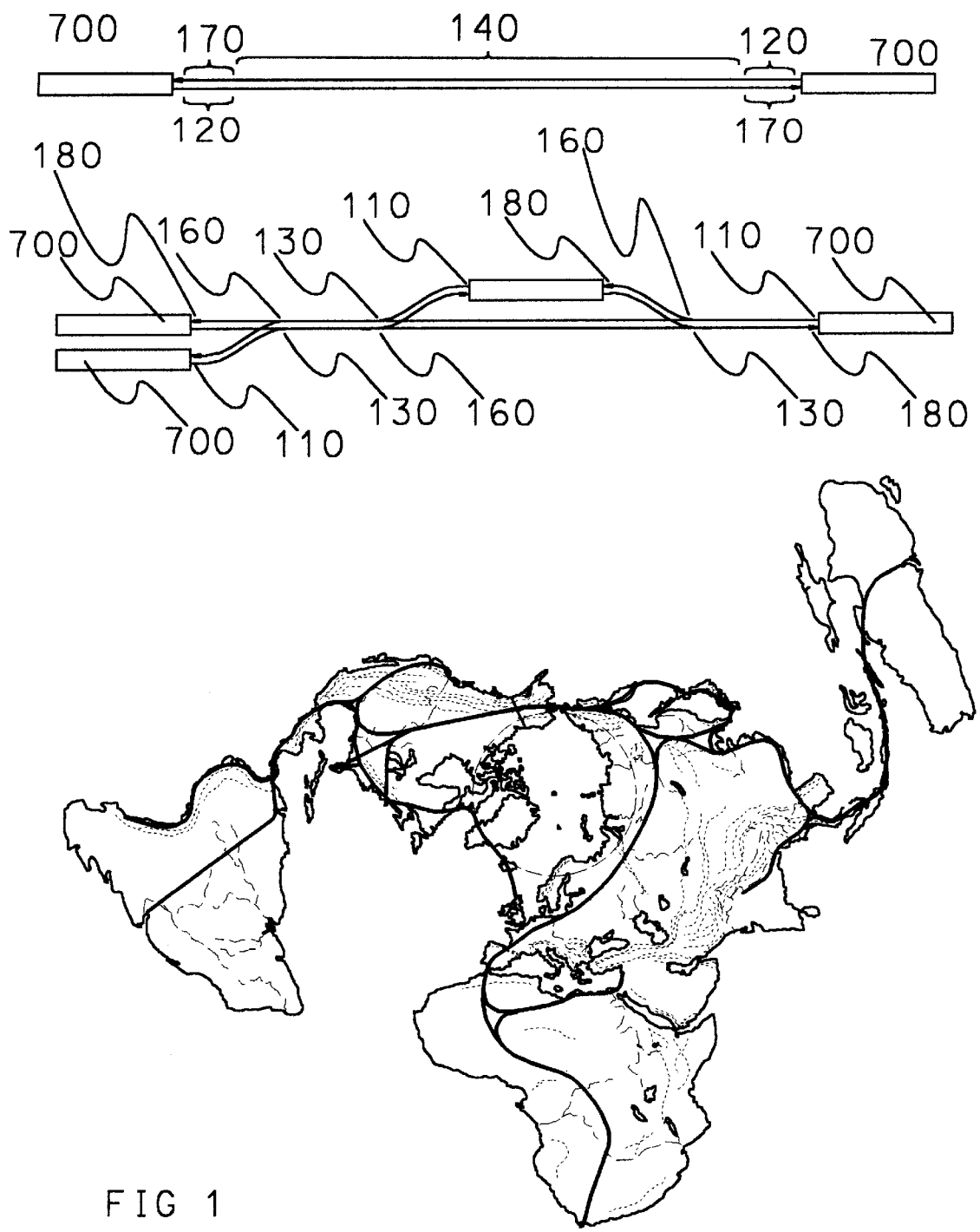
FIG. 1—a schematic plan view of a basic Evacuated Tube Transport System.
Figures 2, 2A:
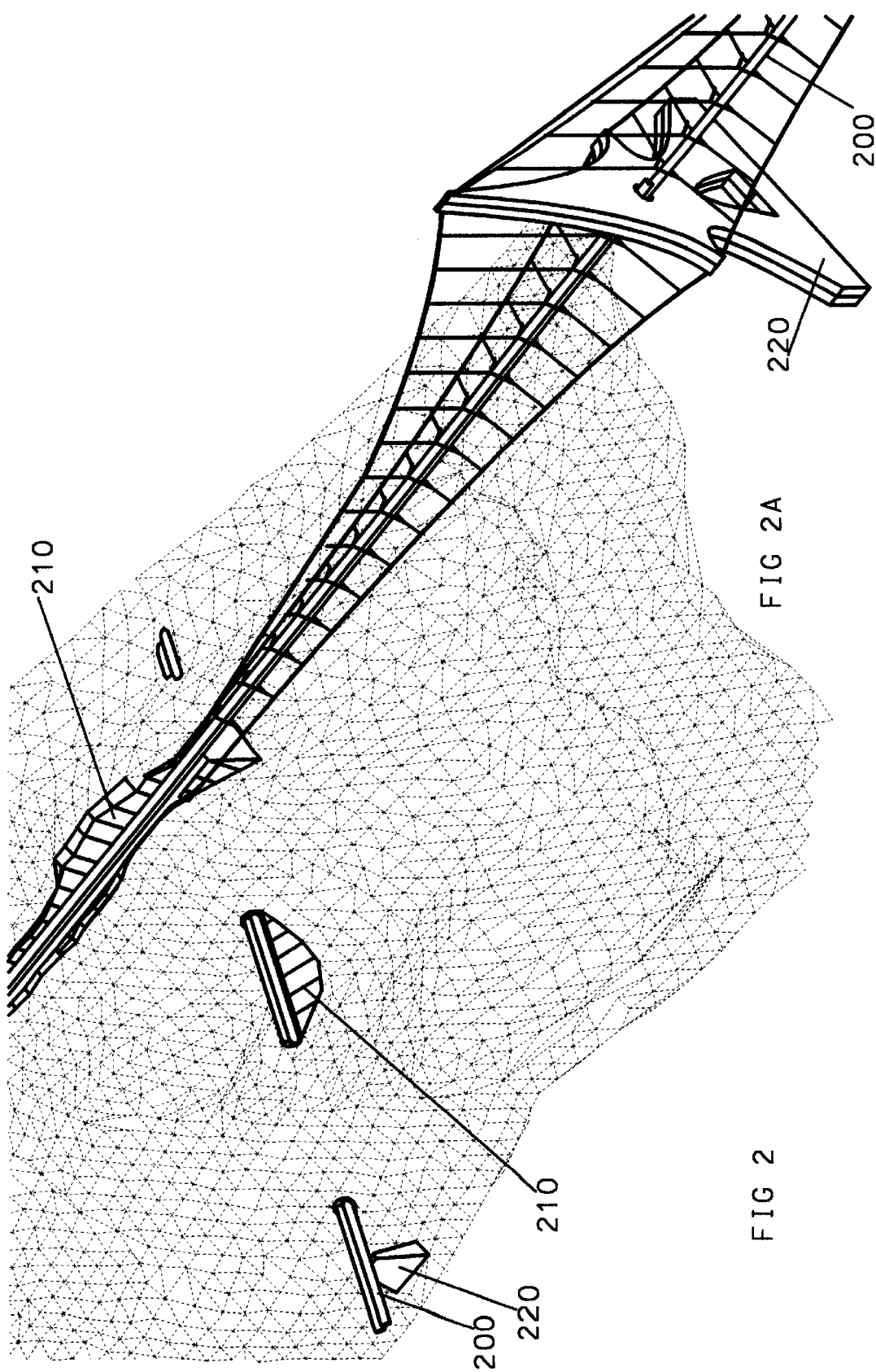
FIG. 2—a perspective view of route gradings, and tube placement and support variations.
Figure 3:
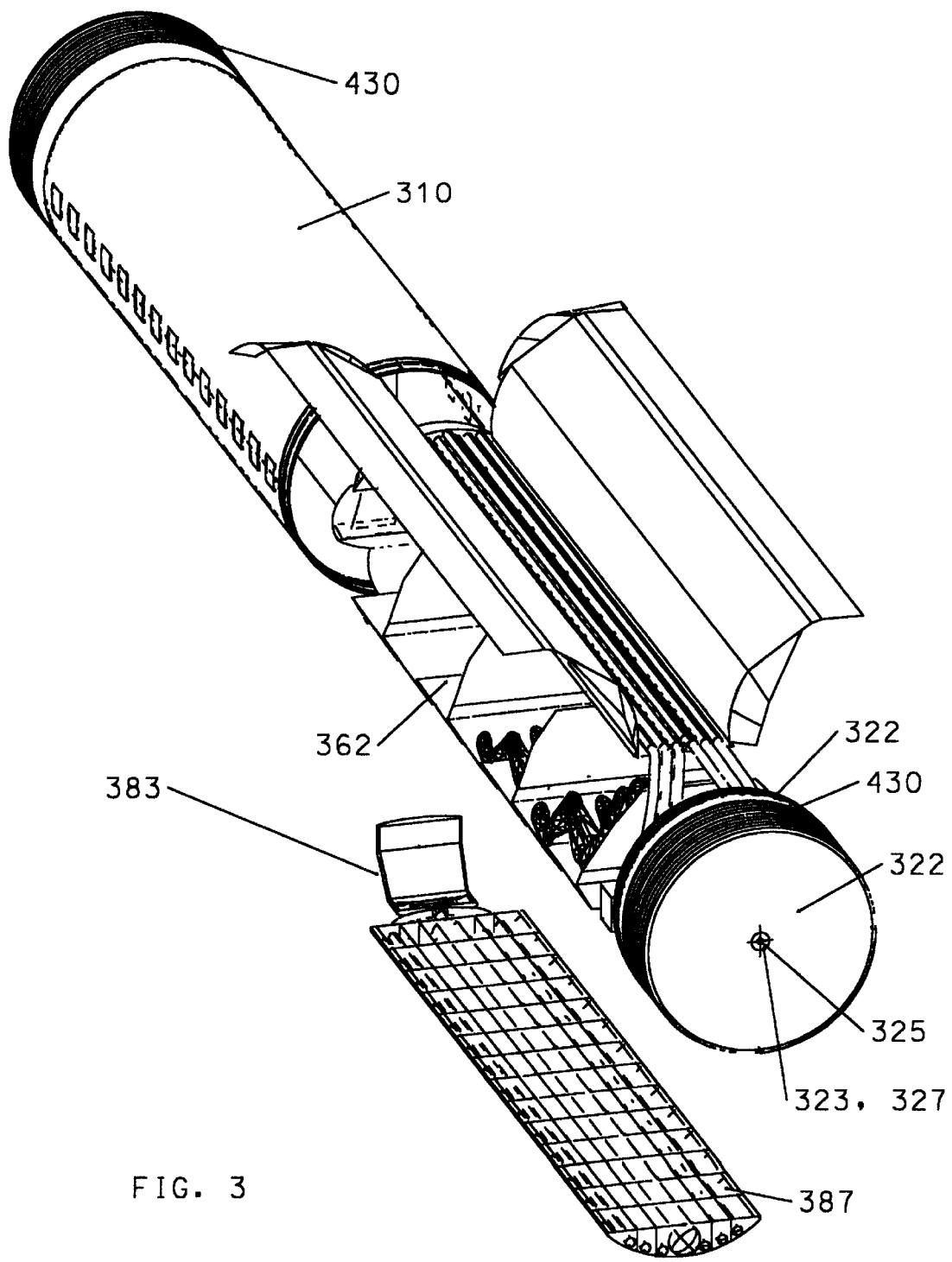
FIGS. 3–4—perspective views of a capsule with life support equipment.
Figure 4:
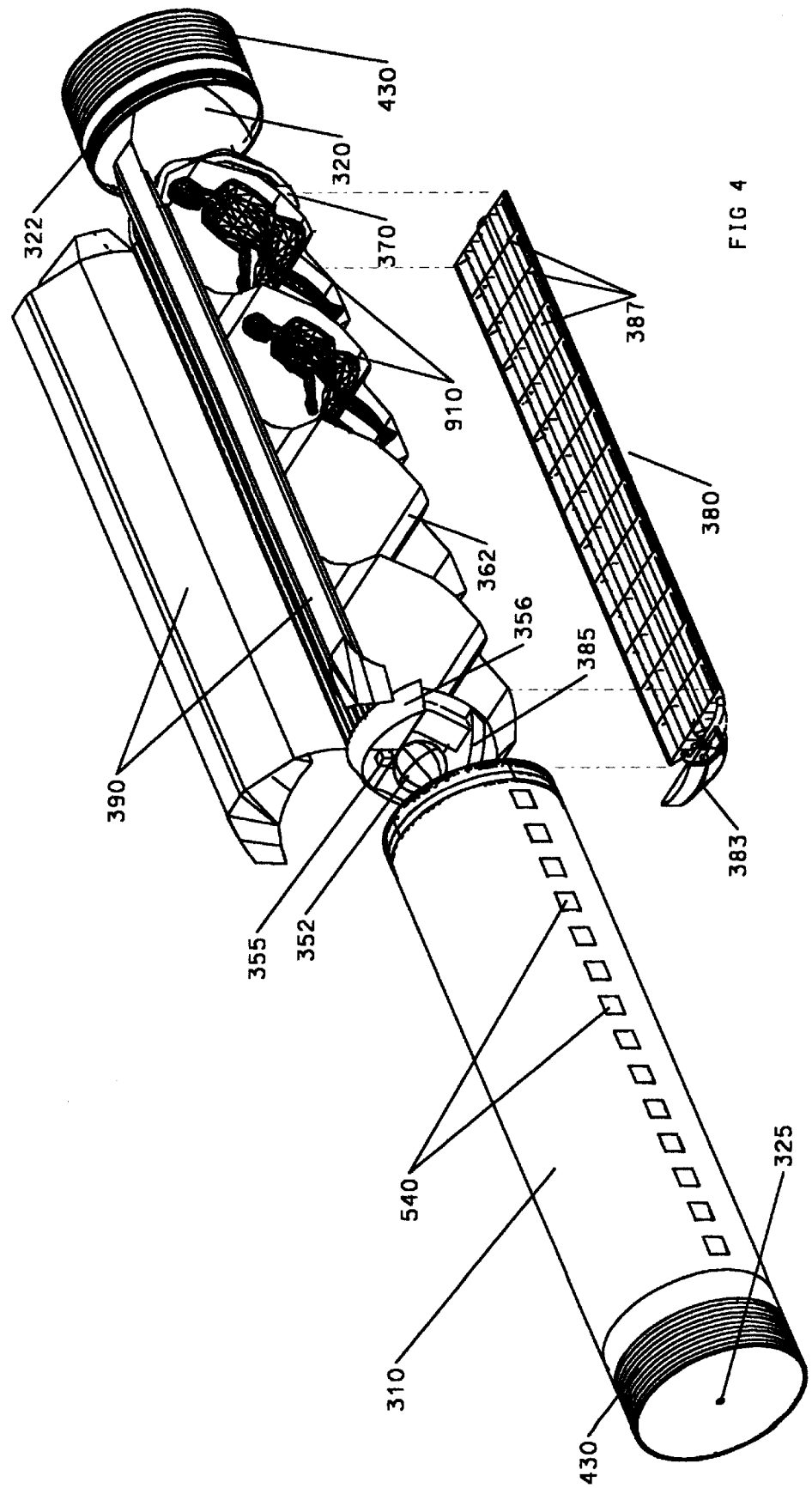
Figure 5:
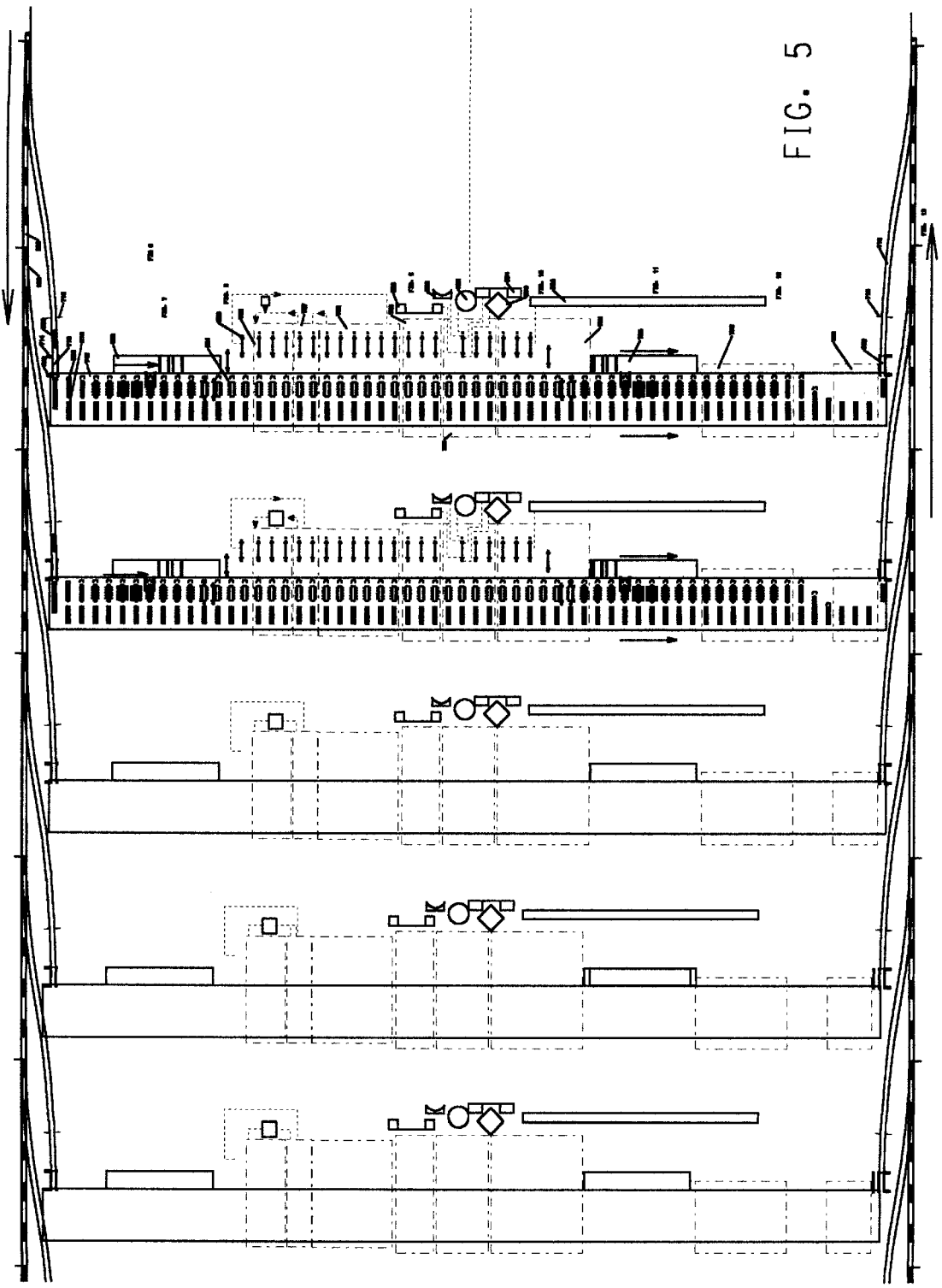
FIGS. 5–13—schematic views of terminal stations and various functions at the terminal stations.
Figure 6:
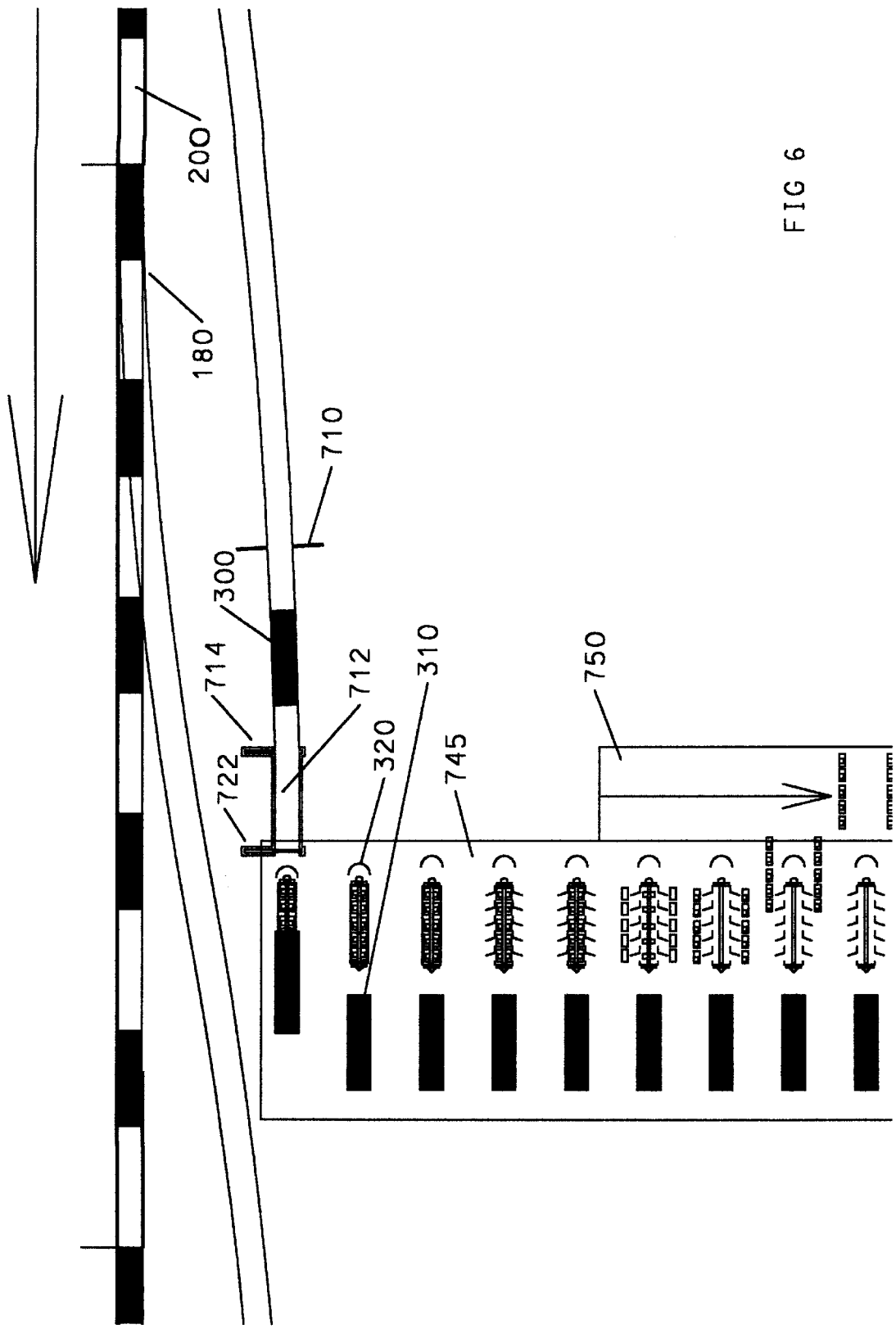
Figure 7:
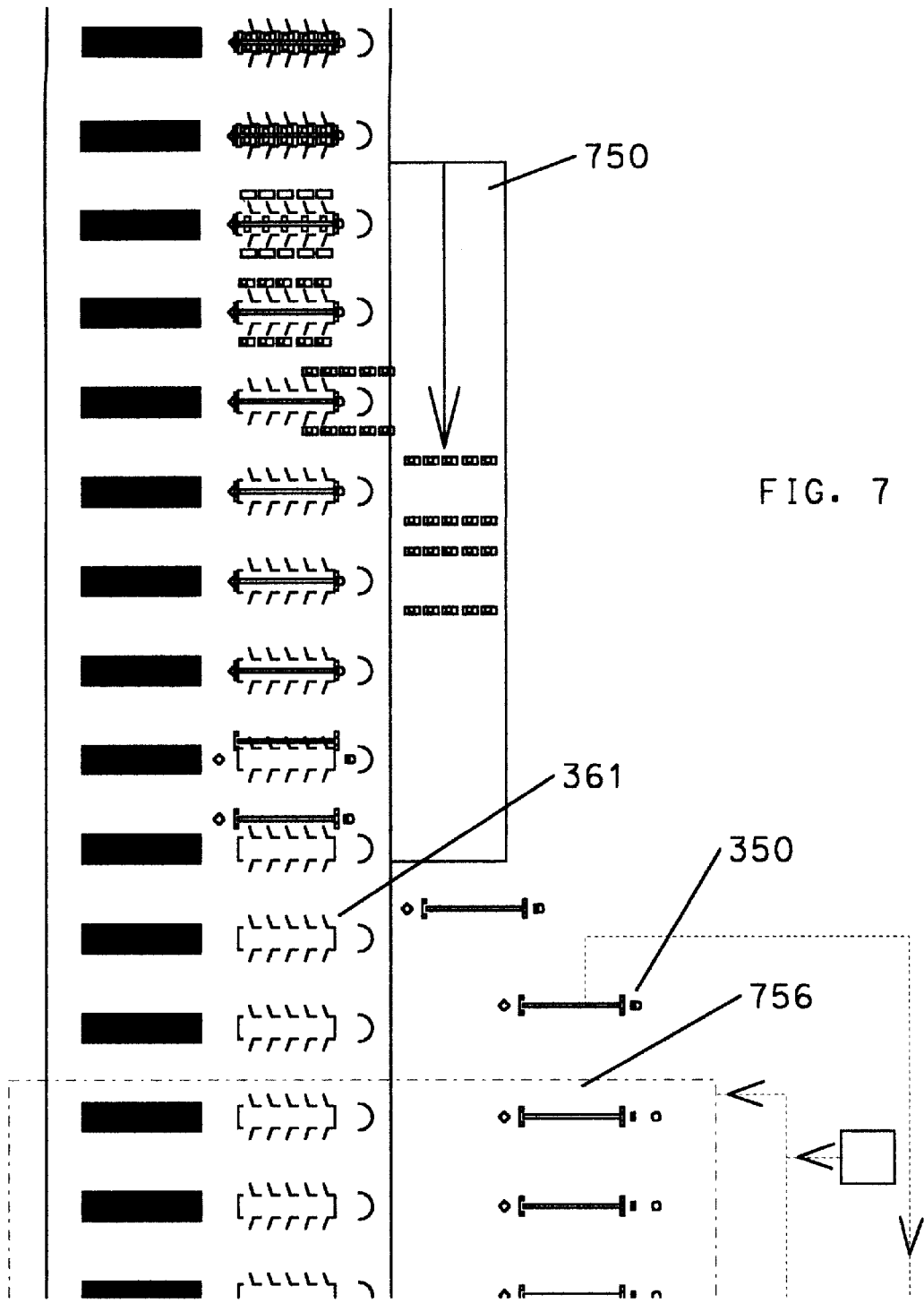
Figure 8:
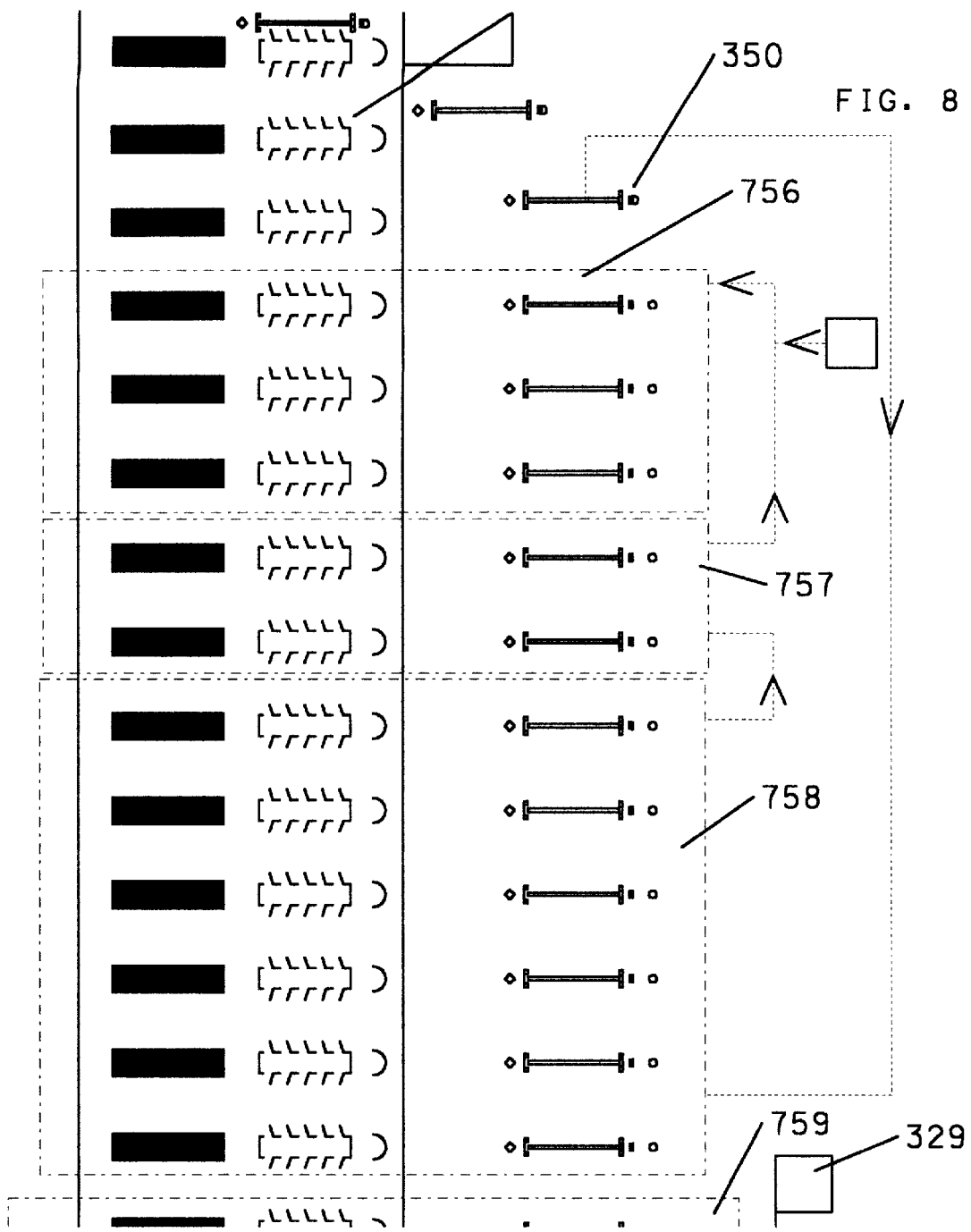
Figure 9:
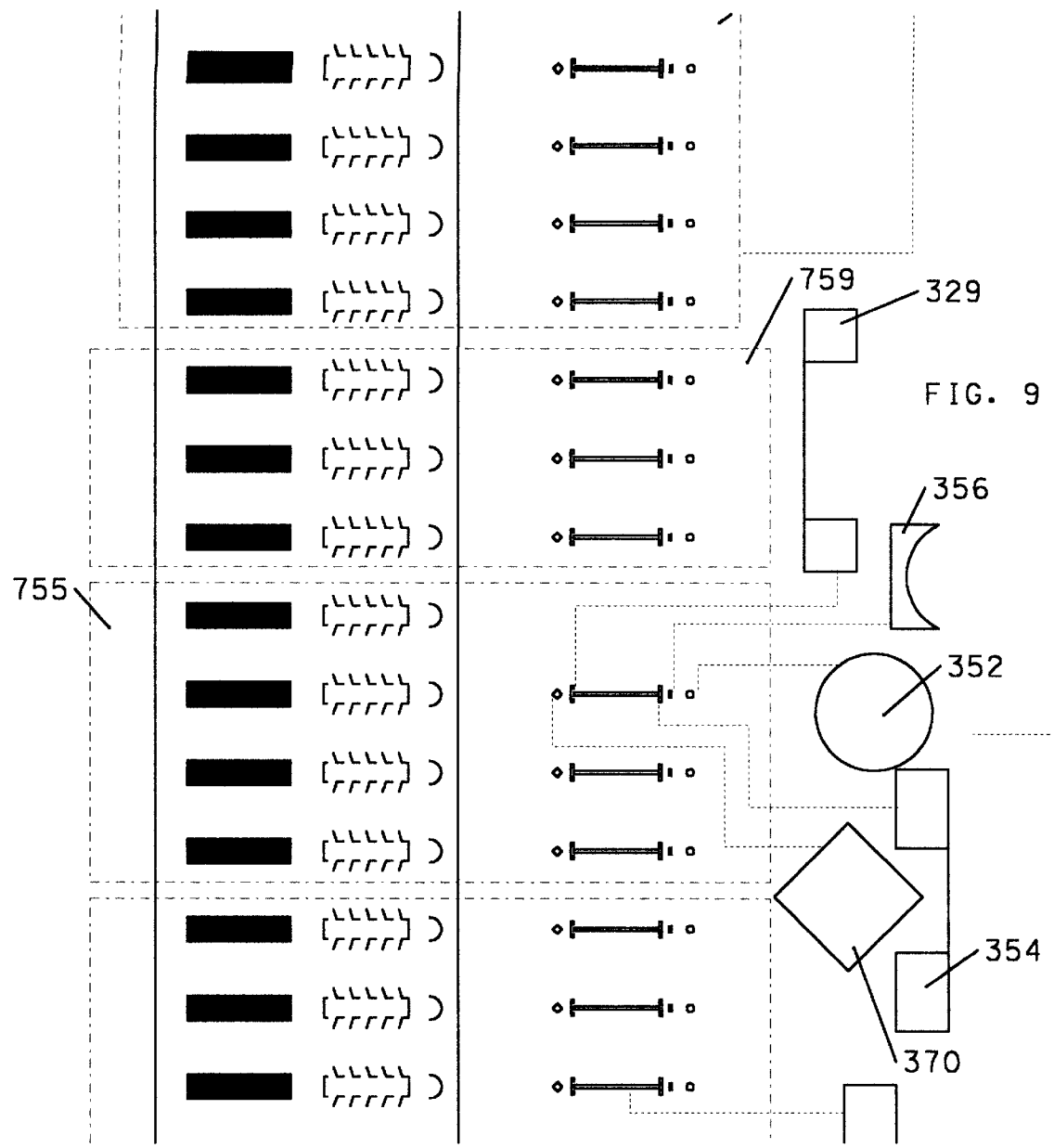
Figure 10:
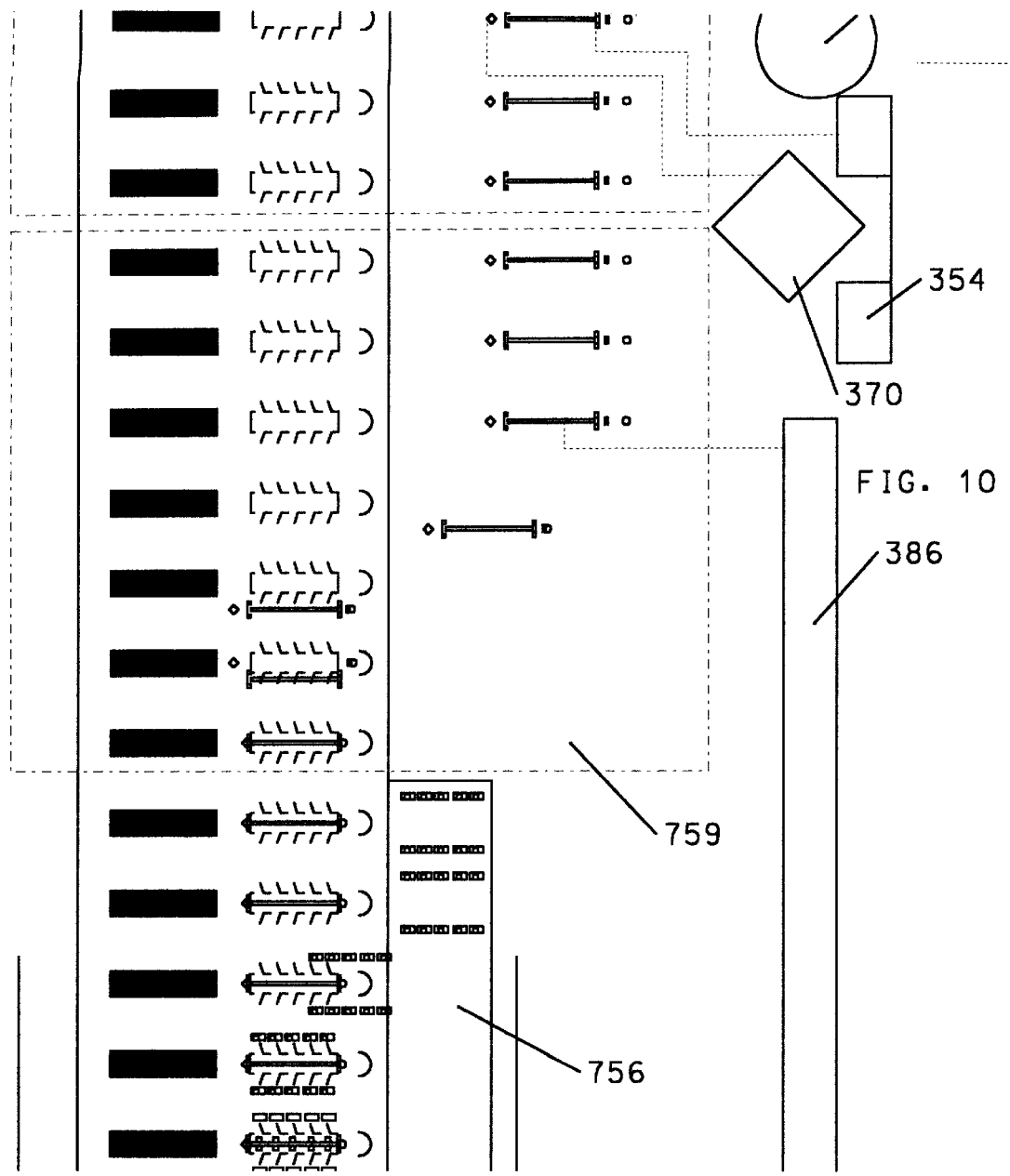
Figure 11:
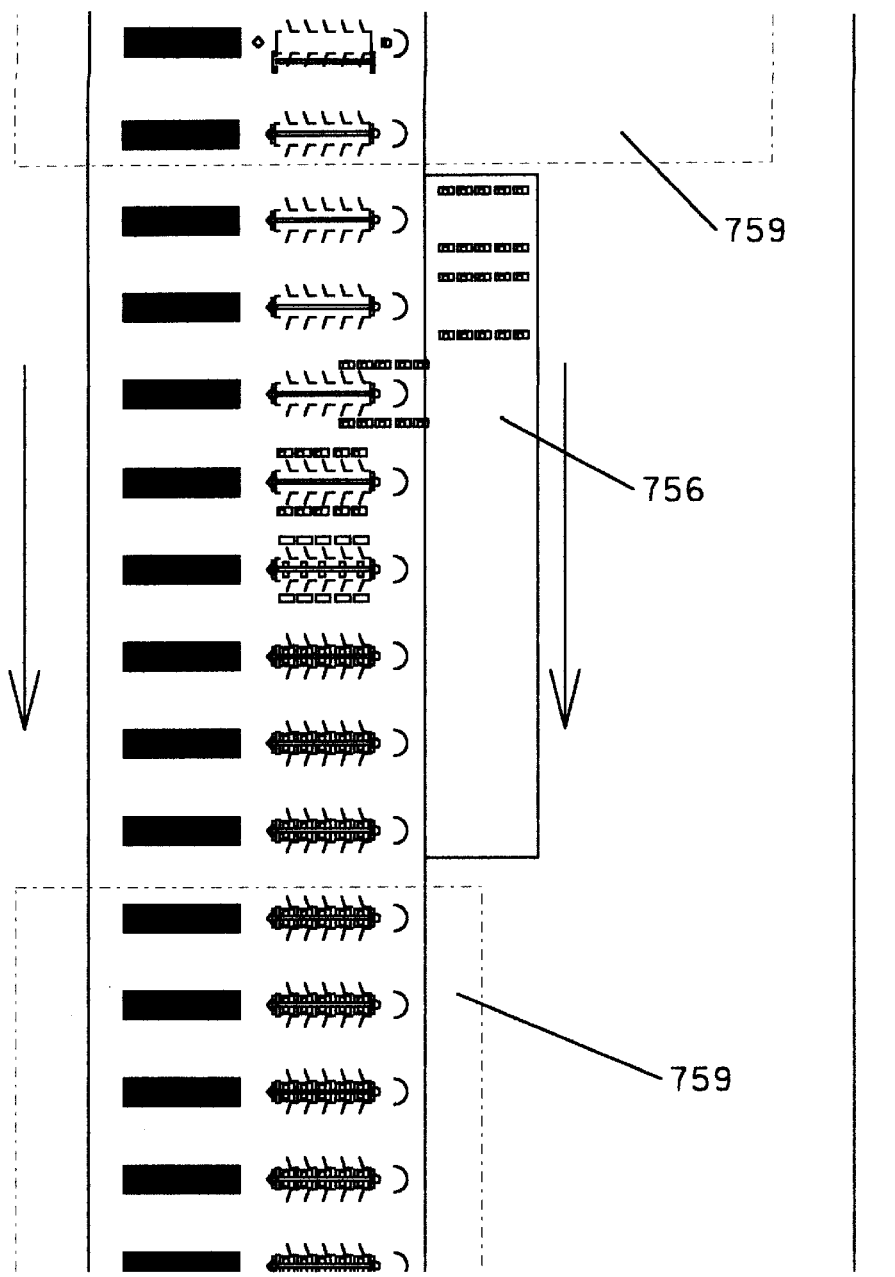
Figure 12:
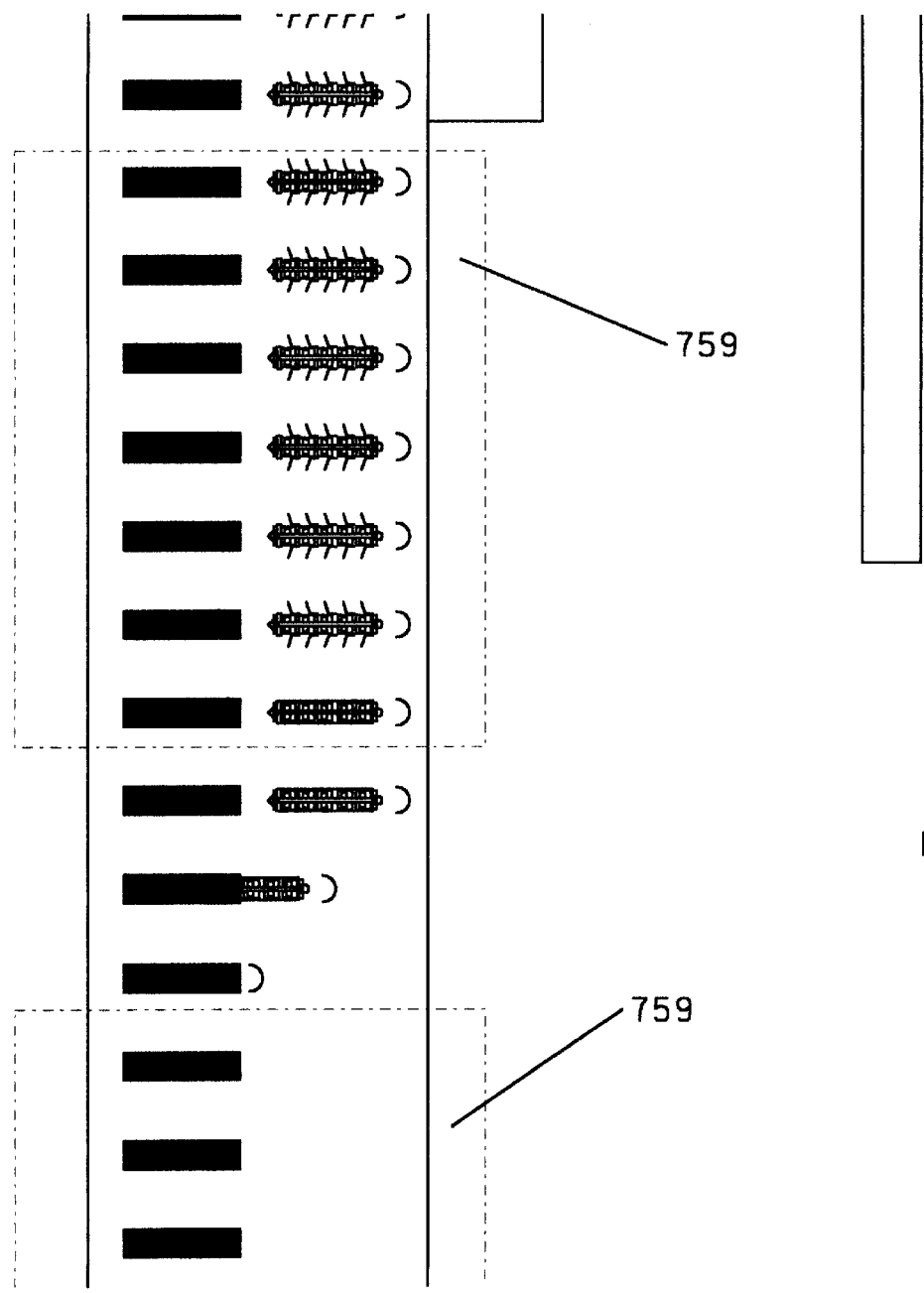
Figure 13:
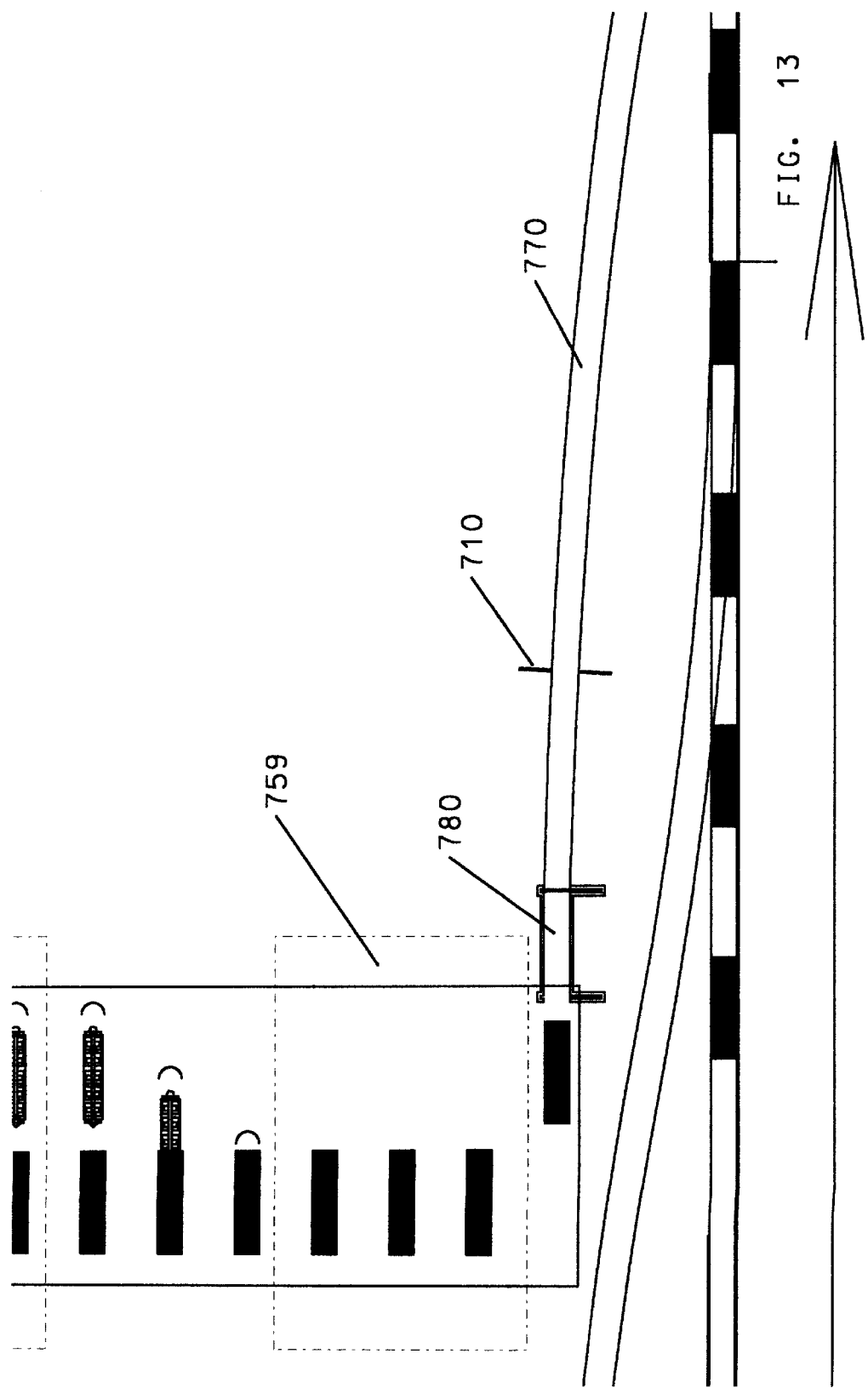
Figure 14:
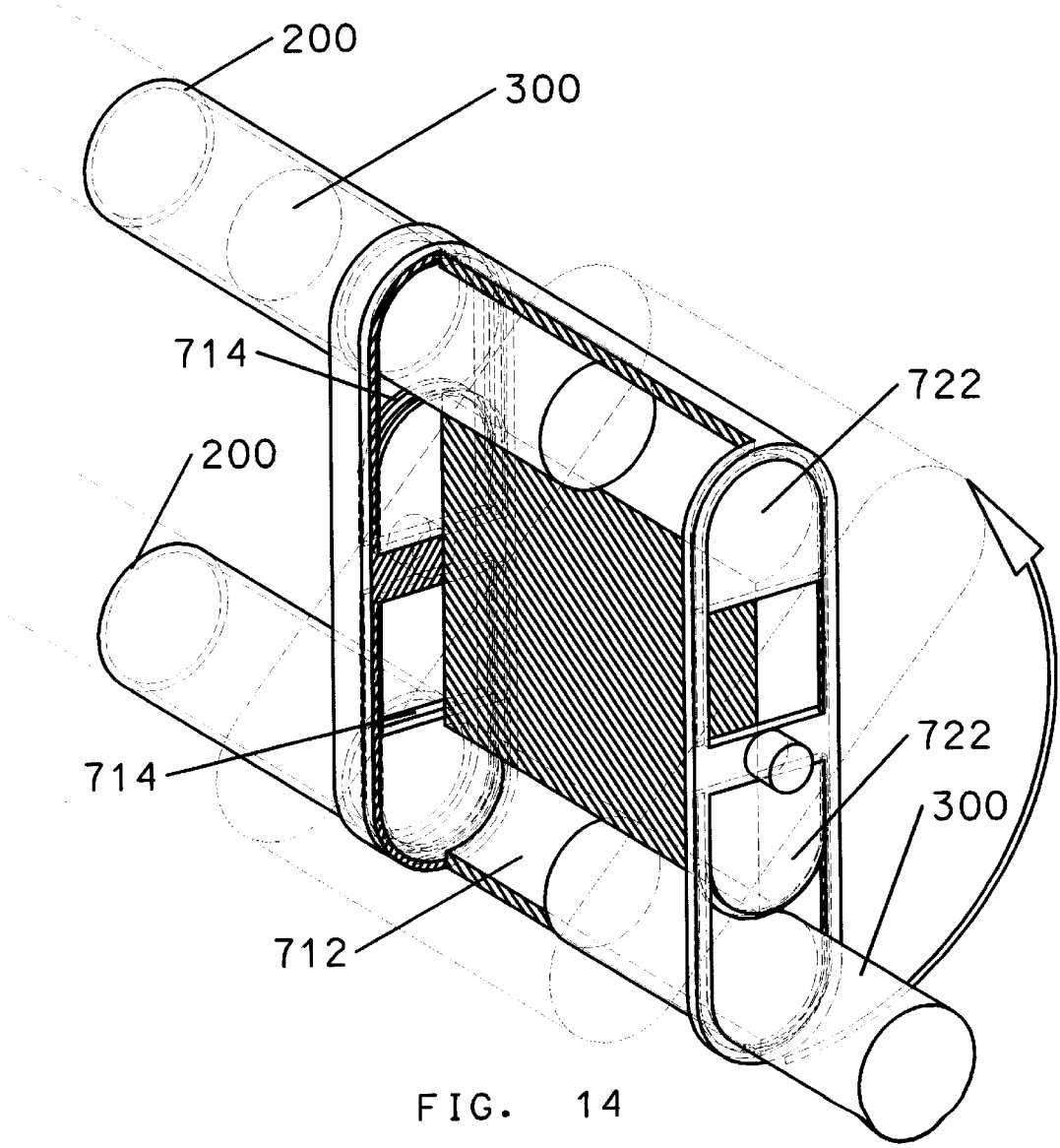
FIG. 14—a perspective view of a capsule loading assembly at a terminal station.
Figure 15:
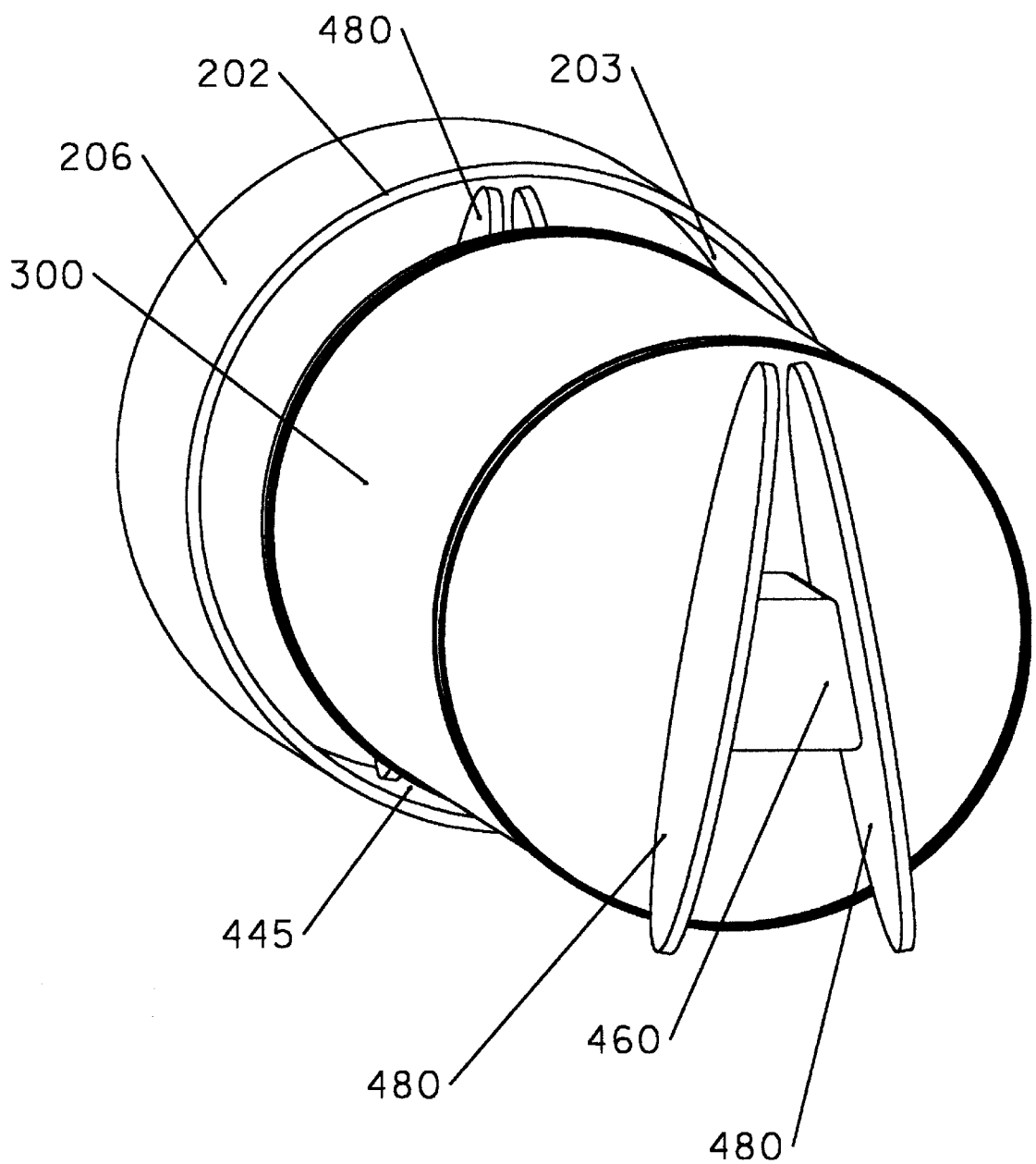
FIGS. 15–17—perspective views of mechanical supports and accelerators.
Figure 16:
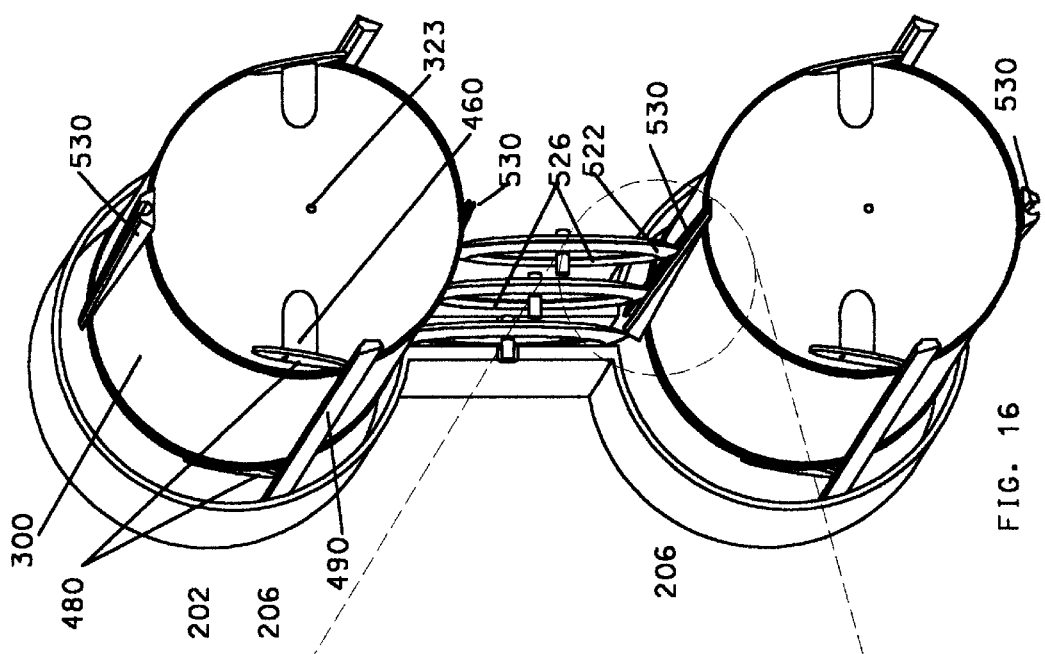
Figure 17:
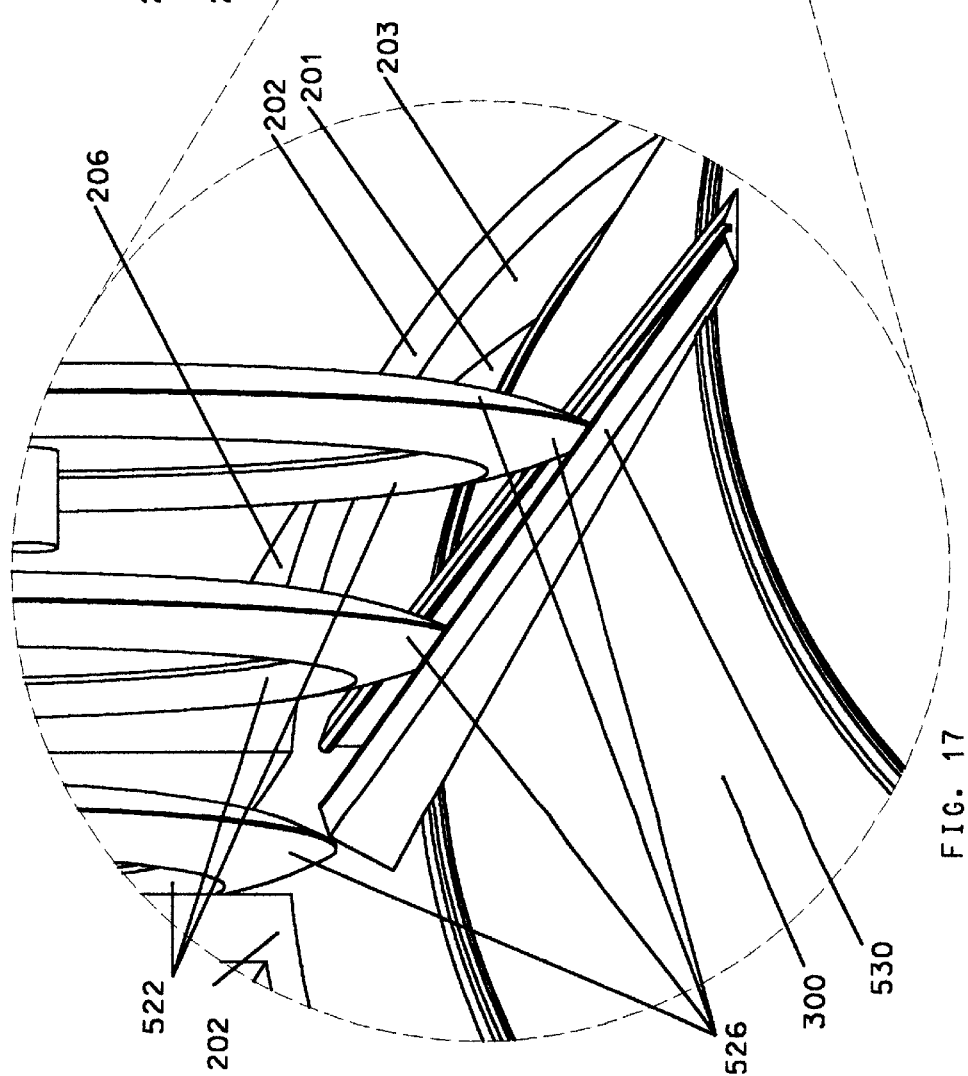
Figure 18:
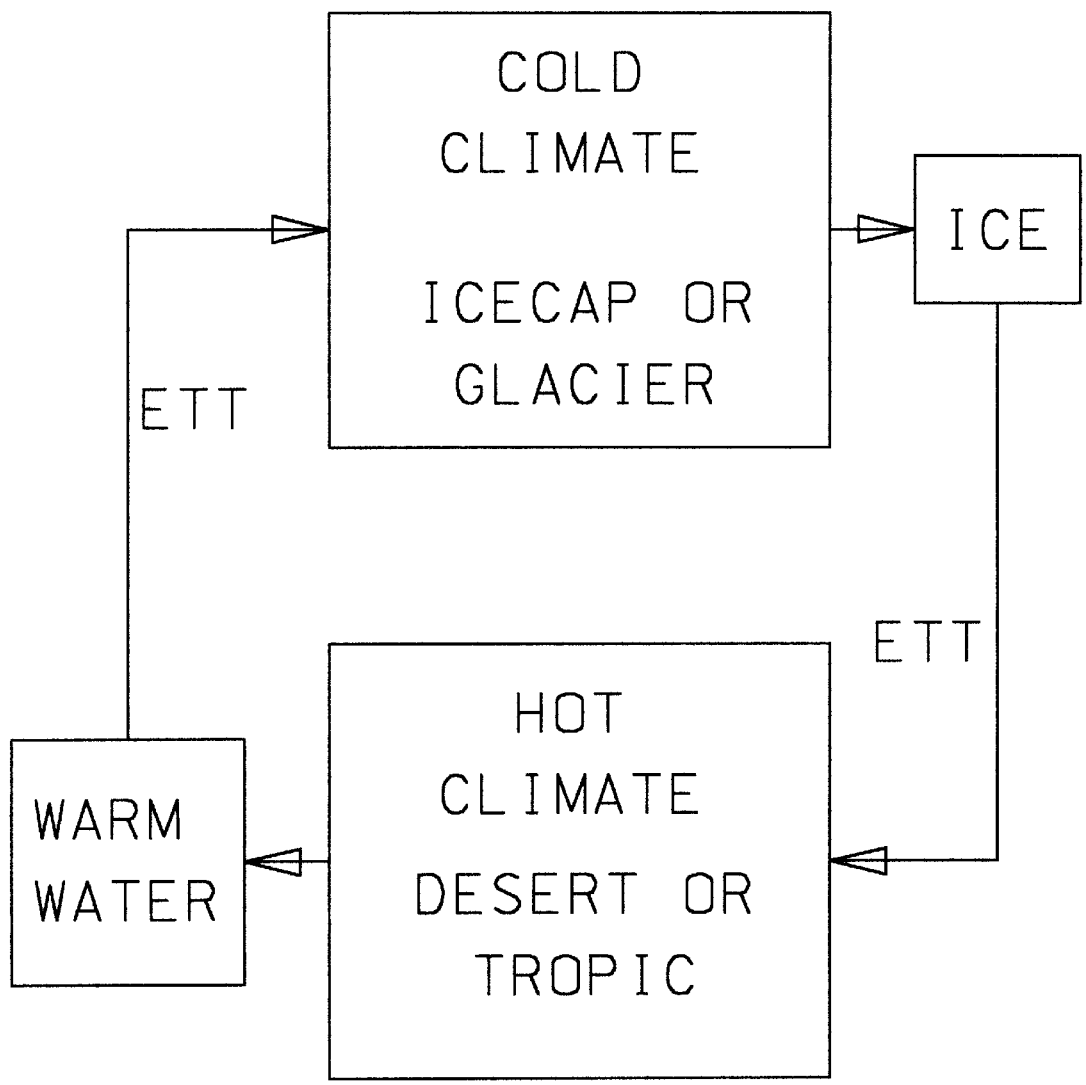
FIG. 18—a schematic of low grade heat transfer.

The Evacuated Tube Transport (ETT) system has many different possible preferred embodiments, depending on the desired use, as will be apparent to those versed in the art. The elements that all embodiments share are: a) An Evacuated tube constructed along a desired path of travel.; b) A capsule enclosing occupants or cargo fitting inside of the tube; c) a means to move the capsule through the tube; d) a means to load and unload the capsules while preserving the vacuum in the tube. e) a means of maintaining tube alignment such that accelerations produced are capable of being absorbed by the suspension system. f) means of maintaining safe operating clearances between capsules. g) means to safely merge and divide capsules from parallel tubes. Whereby aerodynamic forces are substantially eliminated and likelihood of collision is substantially eliminated.

The ETT embodiments can be varied to compete with existing modes of transport. Since aerodynamic drag and heating are virtually eliminated efficient high speed travel is now possible. ETT systems can be divided into three basic categories according to design speed. 1) low speed up to 300 MPH, to compete with current ground transport. 2) medium speed up to 1200 MPH, to compete with air transport. 3) high speed to 24,000 mph, without any current competition.

To fully exploit the high speed potential of ETT, magnetic and electromagnetic technologies are preferred to rolling contact elements as a suspending and powering means to conduct a capsule through an evacuated tube. With the elimination of aerodynamic forces, magnetic suspension systems are more attractive for ETT systems with a design speed greater than about 300 mph. This does not preclude the use of other suspension or powering means. Conventional rolling elements are cost effective for ETT systems having a design speed less than about 300 mph. Magnetic suspension systems are more costly than rolling elements but the speed potential is much higher.

It is likely that the first usage of ETT will be to compete with airline and high speed rail along highly used routs of travel. Major cities of medium distance, and having non difficult terrain between will be the first to connect using ETT. For example: Boston to New York to Washington D.C.; Dallas/Ft. Worth to Houston; etc.

DETAILED DESCRIPTION OF THE PREFERRED EMBODIMENT

The Route (100)

The major ETT design considerations are: demand for service, distance between points, geology, climate, and available funds. Consideration of these factors determine the type of ETT system to use and the design speed.

As with any form of transport, design speed is the major cost variable for a given ETT route. For a high design speed, the tube must be very straight because the amount of acceleration that the human can tolerate is limited. The centripetal acceleration of an object traveling a curved path is proportional to the velocity squared divided by the radius of the curve. For low centripetal acceleration at high velocity the minimum radius must be large. At 1 G lateral acceleration and 1 mile per second velocity, the tube can only curve with a curve radius of 164 miles. The minimum turn radius is determined by the design speed and the acceleration that can be tolerated. Merge/divide zones grow in length as design speed increases. Grade transitions are also subject to the same minimum radius considerations as curves to avoid high or negative g's. The maximum grade is determined by propulsive force available, as will be apparent to those versed in the art.

The ETT is constructed according to current technology of; road building and grading, tunneling, bridge building, pipe laying and environmental engineering. The expense of construction compares with the cost of roads, freeway, or rail only where the terrain is flat or the tube speeds low to moderate. The grading, tunneling and bridging expense in hilly or mountain regions for the ETT is very high if design speed is high. Special care, known to those versed in the art, is required in areas where seismic activity is expected. For long life and safety the ETT is built to withstand all of the expected forces of nature. Drainage of storm water for a 1000 year storm is desired for high design speeds. The route(100) must be situated where critical components cannot be damaged by accident.

Accessibility for maintenance is provided. Where tunnels are used extra room is available for service and repair of system components. Environmental factors such as; acid rain, extreme ultra-violet radiation, frequent sand storms, etc. require materials and maintenance procedures known to those versed in the art.

At high design speeds security of the system becomes a greater concern, since potential for destruction varies with the square of the speed. Wildlife are given ample places to cross (to avoid blocking natural movements). Rite of ways for utilities can be shared or planned concurrently to reduce costs.

Marine requirements relate to: current, temperature, depth, wave, bottom geology, salinity, corrosiveness, resonance.

The preferred locations for a high speed routes are between densely population areas, and over flat land. The strait between Alaska and Russia is the location for the minimal distance across water for an intercontinental route. The intercontinental routes proposed in FIG. 1 minimize distance over water, and mountains between population densities.

The Tube (200)

The tube (200) is the main component of the ETT system. The main function of the tube (200) is to provide a lasting, evacuated path of travel for a capsule (300). The tube (200) also serves to contain capsule suspension (400), powering (500) and braking (600) means. The tube (200) is the main load bearing member to span distances between supports (220) and resist external pressure from the atmosphere or water.

The tube wall (202) consists of one or more membranes (204) that are substantially impervious to gasses and liquids, structure (205) to resist external pressure and capsule suspension and powering reactive forces, and a protective liner (203) and cover (206).

The tube (200) can be manufactured in sections and assembled, or constructed on site in a continuous process using self advancing forms or mandrels, raw material and the tube (200) itself to conduct raw materials or segmented parts.

The tube (200) inside crossection is substantially constant; it is sized according to the desired capsule (300) size, plus an operating clearance, plus space for suspension (400) and powering (500) (SP) means.

To minimize stresses and weight the tube (200) is of a round cross section, but other cross sections are not outside the scope of the invention. SP means can be made integral within the tube wall (202) or made removable for replacement and service. A substantially rectangular section may be preferred is some cases, as will be apparent to those versed in the art. The linear accuracy of the tube (200) effects the efficiency, comfort, and speed potential of the system. The tolerance of the linearity and cross sectional shape of the tube (200) is determined by the desired gap dimension between the capsule (300) outer limits and the tube (200) inner dimensions.

The tube wall (202) is made of a strong, durable, low cost, substantially impervious material not limited to: sealed reinforced concrete, steel, aluminum, or fiber reinforced plastic substance. The tube (200) and all components are designed for strain below the fatigue limit in regard to external pressure, and the cyclical stresses involved from conducting capsules (300). The advantages of one material over another evaluated according to the desired location, and design speed of the tube (200). The material selection of the tube (200) also depends on the SP system used. Electrically conductive substances are avoided if the design of the SP is such that a conductive tube (200) would contribute to magnetic eddy current losses. The tube (200) is designed to resist the compressive loads due to atmospheric or hydraulic pressure acting on the exterior of the tube (200). The tube (200) and all components are designed for strain below the fatigue limit for the cyclical stresses involved. Multiple walls (202) are used for added safety, or to improve the extent of evacuation.

The inner surface (203) is made smooth if an airlock deploying from the capsule is desired (for example near emergency escape hatches). The inner surface may be contoured to provide a guide way for rolling elements, or attach points for suspension or powering means. A non load bearing inner liner can be used to enhance evacuation. An inner liner (203) made of a low friction substance like PTFE provides a sealable surface for a special evacuation capsule (813), and acts as an emergency dry lubricant to protect a capsule and the tube in case of suspension failure, and any undesired capsule contact.

The outer surface (206) of the tube is substantially impervious to atmospheric gasses. Some leakage of small atoms like helium is to be expected. The recovery and sale of these enriched gasses help offset the cost of removal. The outer surface (206) protects the structural wall (205) of the tube from environmental effects.

Tube reinforcement structural elements (205) are required to resist the stresses of atmospheric pressure acting on the exterior, span loading of the tube and capsule weight, and suspension and powering reactive forces. Materials and specific orientation are according to established art.

The tube bed (210) can be placed at grade, below grade by tunneling, or elevated above grade by supports. The tube can be supported continuously or at intervals consistent with the design speed, maximum loads expected, soil and geologic conditions, topography, and the maximum deflection permitted, as will be apparent to those versed in the art.

The tube supports (220) are designed according to accepted construction and engineering practice, as will be apparent to those versed in the art. The supports (220) support the tube (200) at intervals along its length. In locations subject to large earth movements, the supports are adjustable and can be relocated if the alignment actuators run out of travel. Elevated sections can be supported with columns, piers and girders, suspension cables, or any other suitable means. Under ground sections are supported at intervals within a tunnel, the tunnel provides maintenance access and drainage.

The natural vibration frequencies are dependent on the span, weight and stiffness of the tube (200). To minimize the chance of destructive resonate capsule oscillations; the distance of the span is randomly varied, weight (254) is randomly added, or stiffness is randomly varied, within predetermined ranges. This varies the natural frequency of a span. The randomness is introduced span by span to produce a "white noise" vibration function to eliminate tube frequency related vibration mode resonance. The tube supports (220) use dampers (250) to dampen any vibrations. Dampers (250) interposed between a weight (254) and a point near the center of a span act to reduce vibration.

To cross water the tube (200) can be constructed with a positive buoyancy and suspended off of the bottom of the body of water. Moorings constrain the tube vertically against buoyancy and laterally against currents. The tube is below the surface far enough to avoid ships, weather conditions and wave action; or as conditions permit laid on a graded bed (210) or supports (220) on the bottom.

Variations in tube alignment can occur due to geological or seasonal movement of the earth. At high speeds even a small local deviation of the tube will cause a big bump to be felt in the capsule, or if excessive, damage could occur. Alignment (230) of the tube is accomplished by any suitable automatic or manual means consistent with the requirements unique to the particular rout (100), suspension system, and design speed used. The alignment system consists of tube alignment sensors (232) and tube position actuators (234). The alignment sensors can use laser beams or other means to measure the position of the tube at all supports. If laser means are used on curved sections of the tube the beam is deflected an appropriate amount with a mirror or prism as will be apparent to those versed in the art. Laser alignment sensors can include an aperture the diameter of the laser beam plus the position tolerance of the tube. The horizontal and vertical tolerance may be different. The apertures are fixed to the tube at every support having adjustment means. The laser sensor aperture is surrounded by photocells that sense the laser beam. The photocells may be phase sensitive to reject reflected signals. The photocells are all around the perimeter of the aperture so if the tube should move due to earth movement or vibration the laser will strike a photocell. When a photocell is triggered by the laser the signal causes the appropriate alignment actuators (234) to move the tube so the laser passes through the center of the aperture. In curves the beam is deflected by a prism or mirror in (or between) each aperture to compensate for the curvature. Two such lasers and aperture strings are mounted 180 degrees apart on the tube wall. If on the outer tube wall, maintenance is simplified at the expense of reliability and protection. If the laser is inside the tube repair is difficult. Two small evacuated alignment tubes mounted on the exterior the tube (200) provide an efficient path for laser beams and a mount for the sensor apertures and beam deflectors. Three alignment sensor tubes mounted 120 degrees apart provide redundancy. A failed sensor or laser can be repaired while the system is in operation.

The laser may be used for ultra high speed digital communication, eliminating the need for fiber optic cables and satellites, the evacuated environment virtually eliminates noise caused by rain, smoke, etc. The extra cost of the communication laser and a receiver is more than made up for the elimination of cable, or satellites. The savings help offset the cost of construction.

Other alignment means include:

Manual sensing and adjustment for low speed ETT systems. Recording accelerometers (841) on the capsules note locations along the tube where accelerations are out of tolerance. Alignment personnel are directed to those locations. Optical surveying instruments are used to measure alignment, or capsule accelerations are used to calculate the required adjustments. Adjustment takes place with screw jacks. The jacks are locked to prevent tampering.

Another possible alignment means employs; Radar, Laser, sound or other radiated signal from each support are sensed at two or more common locations a perpendicular distance from the tube, triangulation and distance calculations determine actuator adjustments to bring the tube into alignment. Alternatively the signal may originate at the fixed, off tube locations, and sensing may take place at each support. Earth orbit satellites or other fixed or moving objects send or receive signals to or from the tube supports. The signals are used to calculate and adjust tube support position.

If the lateral acceleration times the capsule mass exceeds the available suspension force the capsule (300) contacts the tube (200). At high design speeds contact of the tube (200) and capsule (300) must be avoided. If position sensors (440) in the tube (200) or capsule (300) indicate out of tolerance clearance (445), the speed of capsules is automatically reduced, or the tube (200) realigned. When a gap sensor (440) senses an out of tolerance gap (445) the appropriate alignment counter is incremented. If the next capsule (300)

is out of gap tolerance in the same direction the actuator is incremented to compensate. If the next capsule is in tolerance no further adjustment is made. If a tube alignment sensor (232) such as a laser indicates an out of tolerance tube alignment the actuators are adjusted to maintain alignment. If the alignment sensor (232) and suspension gap sensors (440) are out of agreement, a sensor is suspect and the capsule speed is adjusted to maintain gap (445) tolerance until the problem is corrected. Position sensors are located at vibration nodes and anti-nodes. The anti-node sensors do not directly control the actuators (234) but are used to confirm alignment of the tube (200), and sense vibration. By recording node and anti-node position with respect to time and node and anti-node suspension gap capsule by capsule an accurate determination of capsule and tube vibration and alignment characteristics is determined. The graphs of these functions show any trends of earth shift, (possibly having added use in earthquake prediction). The natural frequency of all capsules (300) and all tube (200) spans is known, this combined with capsule (300) weight and velocity data allows computer calculations to confirm expected capsule (300) suspension gap (445) with respect to tube position. If the calculated position is confirmed, adjustment is made to the tube support (220) alignment actuators (234) to maintain safe operation. If the calculated capsule position is not confirmed by the position sensors a sensor fault is suspected. Small test alignment changes will pinpoint a faulty sensor for repair. When rates exceed established norms alarm is given and appropriate intervention is made. Intervention can be slowing the capsule speed, or not sending any more capsules until repair is made (depending on the nature and relative risk of the alarm).

To keep vibration and loads within predetermined levels, laser-optical methods, proximity sensors (232) are used. A laser is mounted inside or outside the tube or in a small tube fixed parallel to the evacuated tube. Optical sensors (232) situated about midway between the supports sense the laser position relative to the tube position. Proximity sensors are mounted to sense the running clearance of the capsule (300) within the tube (200). When out of tolerance vibrations caused by tube misalignment are detected the tube (200) is realigned by mechanical means such as; cams, ball screw, or hydraulic actuators (234) operated manually or automatically. Two or more actuators (234) at every support allows a range of perpendicular adjustment. If an actuator (234) reaches the limits of travel, either the tube supports (220) or foundation must be relocated, or the design speed reduced. If tube alignment cannot cure the vibration the capsule velocity is adjusted for all capsules, or vibration dampers are adjusted to provide for a different damping rate. Vibration can also be changed or controlled by movable weights inside or on the tube and between spans. The movable weight is moved along the span to tune the natural frequency of the tube span. The weight can be moved by any known means such as cable and windlass, ballscrew, or pumping of water or other fluid to tanks on the tube. Alternatively unwanted vibrations can be eliminated by one or more rotating or reciprocating masses that provide a vibration component out of phase with the unwanted vibration to cancel it out. The amplitude is controlled by the distance of the weight from the center of rotation, the frequency by the rpm. Rotating anti-vibration means can also be used in the capsules. The axis of rotation is perpendicular to the tube or capsule axis and can be oriented so the non linear vibration vector is coincident to the direction of vibration. The sensor, signal, signal transmission, amplification, conversion, processing, controller, actuation, motor/pump/cylinder, motor/ballscrew, motor/reducer/cam, load sensors, are used according to known art.

The laser is a straight beam making linear alignment accurate. For curved segments the laser beam is deviated along the desired curve at suitable intervals; by prism, mirror or other means. Thus the tube is kept in constant adjustment for smooth operation. Another way to keep the tube level is to float it in a canal, or a larger tube. Baffles in the fluid prevent resonate wave conditions.

A joining flange (208) is used to assemble prefabricated tube sections (209) into a tube (200). When tube materials are excessively stressed by linear thermal expansion relative to the earth, expansion joints (240) are used to keep stresses to acceptable values. An expansion joint (240) is used at intervals along the tube as needed to allow for differing thermal expansion rates and geological movements. To maintain alignment the expansion joint (240) is compliant in the linear direction only. Many possibilities exist for expansion joint design. Telescoping sections provide constraint perpendicular to the tube centerline. The joint is sealed to prevent the entry of air, vapor or dust. A billows type expansion joint seal has the advantage of static sealing. A slip seal joint is less reliable. An elastomeric joint seal aids in linear resonance damping while providing stiction free operation. An expanding billows seal provides a reliable seal while allowing motion in the linear direction. If the tubes linear stiffness and expansion coefficient are sufficiently low, expansion joints (240) are not required, reducing cost and improving reliability.

A tube access hatch (207) is provided for repair and emergency escape. The hatch rests on a tapered sealing flange or seat. The hatch (207) is tapered to match. The hatch (207) opens outward only. Hinges, a track or other means of restraining the hatch (207) are used. The hatch (207) is sealed in place with a sealant or gasket. Atmospheric pressure acting on the exterior of the hatch prevents the hatch from opening when the tube is evacuated. The taper of the seat resists the inward compression. The taper angle is selected to minimize stress concentration in the tube or hatch. An exterior portable vacuum air lock (292) enables access to the tube through the hatch (207). A pressure suit must be worn if accessing an evacuated tube in this manner. An interior portable pressure air lock (296) enables interior component service and access. Sensors and a computer controlled locking mechanism (298) prevent this hatch (207) from opening if capsules (300) are in the tube. The hatches (207) can be opened if the pressure inside the tube is equal to or greater than the pressure outside the tube (200), and the power is shut off. Sensors alert security personnel if attempt is made to open hatch (207). The hatches (207) are used for inspection, maintenance, repair or escape. The tube is sealed to prevent air, water or dust from entering the tube. Sidings (265) and switches (260) allow for the merging or division of tubes (200).

Construction methods can be divided into two categories; assembly of premanufactured components, or built on site by continuous or batch processes. Combinations of the two methods are possible within the scope of the invention.

The operation of continuous construction is such that the accuracy and linearity (as determined by the design speed) is maintained as construction progresses.

If concrete is used, an inner, and outer form (272, 274) is used. The inner form (272) extends into the previously cast segment a sufficient distance to maintain accuracy of the inner surface. Pre fabricated expansion joints (240) are loaded into or constructed around the inner form (272). Reinforcement (205) is supplied under tension and oriented by supply equipment (373), expansion joints (240) and any suspending and powering equipment to be cast in place are assembled as the inner mandrel (272) is drawn from the tube (200). The outer form (274) is slid into place around the assemblage. Degassed concrete is supplied to ports (273) in the outer form (274) and allowed to cure as the previous inner form is withdrawn from the cured portion of the previously laid tube. The assemblage, reinforcement, loading, and cure of the forms continues in a leap frog style until the tube is completed. Steam heat and moisture injected through ports (277) accelerate the cure. A tube liner can be used as a inner form.

If fiber reinforced composite structure is used a sliding or continuous recirculating band type inner and outer forms are powered by traction wheels acting on the cured composite tube wall at the aft end of the constructing unit. Reinforcing yarns such as, but not limited to; fiberglass, arimid, carbon fiber, or steel are loaded onto multiple tensioning spools. The yarn is run through guides (273) that orient it at an optimal angle and tension for reinforcement. The yarn is either wet with a matrix material such as but not limited to: Rapid cure concrete, light curing resin, thermoset plastic resin, catalyzed resin, molten thermoplastic, or co-oriented with a thermoplastic yarn. The inner and outer mandrels (272, 273) consolidate and cure the tube (200). Vacuum or pressure and heat aid in the consolidation. Cure of light cured resin systems is done by lights in the inner and/or outer mandrel, shinning through transparent windows for the purpose. Steam or electric energy produces heat for consolidation of other matrix systems. The process is much like pultrusion or extrusion except that the tube (200) is fixed and the die and material handlers advance at the speed of cure. The inner mandrel (272) is of fixed diameter. A very slight taper of the inner mandrel (272) allows for contraction as the tube (200) cures and cools. The inner mandrel (272) controls the diameter of the tube the outer mandrel (274) is split and loaded in a radial direction to aid in consolidation of the tube walls (202) and eliminate voids. This allows for slight differences in material feed rates without compromising the integrity of the tube (200). Suspension (400) and powering (500) apparatus are integrated into the tube after (replaceable) or before (integrated) the cure line. The construction apparatus (270) can be operated side by side or integrated into one unit for the co-construction of multiple parallel tubes (200). The construction unit (270) is 'steered' by bending the mandrels with hydraulic or mechanical actuators (234) into the desired radius for the curve desired. Movable guides (279) rest on the tube supports (220) to guide the tube (200) to the next support (220). These guides support the machine (270) as it moves. A laser or other suitable alignment device (232) on the unit insures accuracy and provides a reference for adjustment of the mandrel bending means (234), thus maintaining the desired amount of curvature. For long spans between supports (220) the outer form (274) is changed to put linear stiffening ribs in the tube (200).

Filament winding techniques can be utilized to place and consolidate the fiber reinforcement thus dispensing with all or part of the outer mandrel. A trolley moving back and forth over the fore end of the unit winds the reinforcement (273) and matrix material (275) onto the inner mandrel (272). One or more feed eyes mounted on the trolley rotate around the inner mandrel (272) as it emerges from the end of the tube (200). The rate of rotation and reciprocation are varied to optimize the strength and stiffness of the tube (200). Cure is accomplished with light or heat or other means (277) known to those versed in the art.

Where two tubes (200) merge (130) or divide (160) first the outer (274) and then the inner (272) mandrels are joined together and added thickness is provided to support the increased load. The length that the merge (130) takes place over is determined by the speed of the tubes (200) to be merged. The mandrels are adjusted as the merge progresses to join the two tubes (200) into one. Powering coils (510) for the two tubes to be merged (130) are wired out of capsule frequency phase with each other to merge the capsules (300) together such that uniform capsule spacing is maintained.

If conventional continuous pipe or tube making equipment (such as but not limited to; extrusion, pultrusion, filament winding, continuous braiding) is used, with materials allowing no expansion joint construction; then the tube is pulled along as it is produced and placed on supports as it is made. The supports having means (such as powered or unpowered rollers) to allow the tube to move linearly, and rotate as required. Thus the tube advances along the route and is supported and aligned at the rate the machine is capable of. This eliminates the need for cutting equipment as the tube is made, and joints as the tube is placed. After the tube advances to the desired end, the tube fixed to the alignment actuators and aligned. Evacuation can take place as the tube is constructed. The vacuum used to aid consolidation of the tube wall.

The Capsule: (300)

The function of the capsule (300) is to provide a vehicle to safely transport persons or cargo within an evacuated tube (200). A capsule (300) for live person transport comprises a pressure hull (310), a pressure hatch (340), a pressure seal (345), a suspension system support( ), and a life support module (350). A capsule (300) for suitable types of cargo may forgo life support and pressurization systems.

A pressure hull (310) is the main structural member of the capsule (300). The pressure hull (310) defines the capsule shape and volume. The pressure hull (310) provides a sealed enclosure for air, all interior components, the life support module (350), cargo (950), seating (362), passengers (910), cooling system (380), and coolant (386). The pressure hull (310) also supports suspension (400) and powering (500) components.

All load bearing capsule components are made of any suitable strong, durable, low cost, impervious material such as but not limited to, fiber reinforced composite, metal, wood, etc. The pressure hull (310) and all capsule components are designed for strain below the fatigue limit in regard to internal pressure, and the cyclical stresses involved from conducting cargo or persons. The advantages of one material over another evaluated according to the desired use of the capsule. The material selection of the capsule also depends on the SP system used. Conductive substances are avoided if the design of the SP is such that a conductive capsule would contribute to eddy current losses. The pressure hull (310) is designed to resist the tensile loads due to atmospheric pressure acting on the interior of the capsule (300). The capsule (300) and all its components are designed for strain below the fatigue limit for the cyclical stresses involved.

Practical capsule size starts at 6 inch interior diameter for small parcels with no life support requirements and goes up to the size where over capacity occurs (perhaps around 20 foot dia. for large cargo). For human transport a 2 foot interior dia capsule (300) 6.5 foot long could transport 99 percent of the population. However due to accelerations taking place in different directions this would be uncomfortable unless linear accelerations where kept low, or fluid (364) surrounded the occupant to mitigate the effects of acceleration. It is doubtful that many would want to travel under such unconventional arrangements as being surrounded with fluid. A fluid isolation membrane (366) and life support mask (368) prevent wetting by the fluid and the possibility of drowning. A 4 foot inside dia. capsule 18 foot long accommodates 8 to 12 adults. A capsule this size also accommodates much of the cargo requirements with the seats (362) removed. Capsules (300) large enough to accommodate an automobile are possible but impractical from a cost standpoint, unless the large capsule size is needed for another compatible usage, like movement of bulk cargo.

It is desired that the pressure hull (310) have a length at least three times the diameter to result in stable suspension in the tube (200), however other aspect ratios fall within the scope of the invention. To minimize stresses and weight the pressure hull (310) is cylindrical in shape, with hemispheric ends (320). One or both of the ends (320) serve as a hatch (340) to load and unload components, persons (910), and cargo (950). On the hatch (340) is a pressure release and equalization valve (322), in between the exterior and interior of the pressure hull (310). A hatch seal (345) acts between the hatch (340) and the hull (310) to seal pressure within the capsule (300). A capsule identification number (CIN) (330) is affixed to the exterior of the hull (310). The CIN (330) can be read by automatic means, such as a laser/bar code scanner. A small escape hatch (347) is located in the center of the hull (310) at a location corresponding to the tube escape hatch (207). The escape hatch (347) opens inward. A seal (345) acts between the escape hatch (347) and the hull (310).

A void area of depression (325) in the forward end (320) of the capsule (300) is used to aid in purging any air or gasses from the tube (200). At speed any residual particles or gasses tend to collect in the furthest aft portion of this depression (325), thus building up impact pressure as speed increases. At the maximum speed, and just before deceleration an evacuation valve (327) is momentarily opened that is in communication with a vacuum chamber (329) on board the capsule (300), and the depression. This traps the residual tube gasses and provides for economical removal (by a vacuum means (830)) while the capsule (300) is docked. A higher vacuum is achieved with the capsules (300) assisting tube (200) evacuation in this manner.

A module (360) fits inside of the pressure hull (310). The module (360) houses; a life support system (350), a seating system (361), a cooling system (380), insulating system (390), and a data system (396). The seating unit (361) is the main component of the module (360). The seats (362) are mounted on a pivot (363), (the seats recline in response to acceleration force to minimize the discomforts of bi-directional accelerations.) affixed to the module, in enclosed seating compartments. The compartments are equipped with a door. The compartments door allows communication between adjacent compartments for passengers traveling together. The module is made of an insulating material (390). The seat unit (361) is made with replaceable water proof padding, and stain resistant, easily cleaned and dried surfaces to facilitate washing.

To transport humans or animals it is necessary for the capsules to have a life support system (350) and be pressurized with atmospheric pressure, this consists of; temperature control, compressed air or oxygen storage (352, 354), carbon dioxide scrubbers (356) and the associated SCBA sensors (358) and devices well known to those versed in the art. Reserve life support capacity is provided in case of emergency or loading delays. The pressure is varied linearly in rout to approximate the atmospheric pressure at the destination. Temperature control doors (384) are in communication with the coolant (386). The doors (384) are varied in response to interior temperature changes by standard thermostatic means. Carbon dioxide scrubbers (356) remove carbon dioxide. A oxygen tank (352) with sensor (358), supplies oxygen as it is used, a pressure regulator (355), and absolute pressure sensor (850) controls internal pressure. The air blower (385) circulates the air to maintain uniform conditions. A backup air tank (354) is used to increase pressure or supply air if a failure occurs.

Capsule vibration is reduced or substantially eliminated by a active device such as a reciprocating or rotation masses that can be oriented to substantially cancel unwanted vibration. Vibration is sensed by accelerometers (841), or capsule position sensors, if the capsule vibration is caused by tube vibration, the tube anti-vibration system is used to cure the vibration. Redundant means of vibration reduction include passive dampers that can be tuned to critically damp any expected capsule vibration. The pressure hull can be mounted to the seating module through a hydraulic or friction damper. The two masses (or other masses thus connected) act against each other to reduce vibration. Some passive vibration reducing means contribute to losses, and the heat load that must be carried in the capsule, the energy absorbed by dampers is a loss. Active anti-vibration means can yield higher efficiency due to less heating.

The suspension magnets (420) and reaction drive parts (540) are subject to heating due to losses (aprox. 0.5–5% of total power). A means of storing this heat and preventing its travel to the inside of the capsule is required. A phase change medium (386) like ice for a heat sink, and super insulation panels (390) (employing vacuum chamber and reflective technology, or aerogel) are used to limit internal capsule temperature. The coolant chamber (382) has multiple compartments in contact with heat exchanger tubes (383) that air is circulated through. The air is distributed to passenger compartments. The air temperature is selected by the passenger by moving a proportioning valve between hot or cold air supply. As the ice melts in the individual baffled compartments it is prevented from flowing by the baffles (387) to avoid center of gravity changes as the capsule accelerates or decelerates. When the ice melts in a compartment and the liquid is at or above ambient level the compartment air supply is switched to an un melted compartment. To cool hot parts like the suspension magnets or bearings, coolant is circulated to carry the heat to a double phase change coolant chamber. The high temperature chamber is of sufficient strength to contain vaporized water. More heat can be stored in this fashion. The proportion of high temperature coolant and low temperature coolant is selected according to the heat rejection characteristics of the particular route. The amount of coolant is sufficient to handle all the heat expected. The steam from the high temperature heat sink is utilized at the terminal.

Sensors for; pressure, temperature, position, acceleration, velocity, hatch closure, etc. are used for data collection. The data is processed, stored, and transmitted by the data system (370). The data system consists of a computer (372), capsule records storage (374), i/o devices (376) (like a keyboard, monitor, speakers, and microphone), and a data transfer device (378) (such as wires, fiber optic cables, inferred, laser, or radio telemetry).

Virtual reality head sets or audio/video monitors (376) using tube mounted cameras (280) as sources provide the illusion of travel over the countryside in a clear tube, provide entertainment, allow multimedia communication, or the conduct of business. Communications are provided to the capsules (300) via optical or radio telemetry devices (278) well known to those versed in the art.

The capsule may be fitted with a means to surround or immerse human occupants with a fluid (364) such as water. Much higher linear and lateral accelerations are possible if the human occupant is surrounded by water or other fluid having about the same density of a person. The perceived acceleration is drastically reduced. This method is further valued in that all capsules have the same weight. This makes possible a small diameter (aprox. 24 inch inside diameter) capsule to provide comfortable accelerations in all directions. Individual occupants can be transported in near weightlessness. Direct contact of the occupant with the surrounding fluid is prevented by a tough flexible membrane (366). The membrane (366) is fitted with breathing passageways in a face mask (368) and aspirators (369). A breathing air pressure regulator (367) is used to equalize lung pressure in response to varying accelerations. Ear equalization can be accomplished with a tube inserted into the opening of the eustation tube. The aspirators remove any saliva or puke, when sensed by a fluid sensor, or on signal from the occupant. If the fluid (364) is in multiple compartments each having independent pressure control, CPR can be automatically administered if onboard sensors detect heart or respiration failure. The compartment near the heart is rhythmically pulsed to circulate blood. The breathing regulator and aspirator acting in unison under computer control circulate air through the lungs. Bleeding from an open wound can be controlled by applying additional pressure to areas where bleeding is sensed. Ultra high speed medical transport is thus possible within a minimal sized tube, and with no attendant.

A special maintenance capsule (395) having a expandable external seal is used to service the tube interior without loss of vacuum. This special capsule (395) is self powered and can assists in excluding air from the tube by moving a sliding seal along the tube to push air out, decreasing the time required to evacuate the tube.

Capsule polarity triggers (388) (like magnets for instance) can be set to automatically control switches or other devices in the tube (200). One magnet has 2 possibilities, two magnets yield 4 possibilities, 3=8, 4=16, 5=32 etc. If permanent magnets are used fully automatic switches are possible. The moving magnet causes a electrical pulse that energizes a electromagnet (see section on switches).

Suspension (400):

The capsule (300) is constrained within the tube (200) such that travel along the tube takes place with minimum resistance. Sliding contact is very inefficient, it is avoided by suspending the capsule within the tube with conventional wheels (480), rolling elements, permanent magnets (420), electromagnets (410), eddy current repulsion, or super conductive (Mesner effect) or other levitating means.

Where periodic variations in the continuity of the suspension force are necessitated (At expansion joints (240)), it is important that the frequency of the interruptions (vibration) is not of a frequency that resonates with the natural suspension frequency of the capsule. Random spacing of interruptions is desired if design constraints necessitate periodic inconsistencies in the suspension force.

The capsule (300) can be constrained or free with respect to its roll axis. If constrained, lateral accelerations will be perceived. If unconstrained the capsule (300) will seek the roll position having the lowest center of gravity with respect to accelerations of gravity or curves. Thus a capsule (300) unconstrained in roll should be balanced laterally as it is loaded and the CG is to be as low as possible and lower than the center of suspension effort (below the center of the tube).

400 Magnetic Suspension

Rolling resistance and friction are eliminated by magnetically suspending the transport capsule (300). For minimum resistance to motion it is desired to suspend the capsule in the tube with a magnetic or other suitable force field. The clearance (445) between the tube (200) and capsule (300) is determined by the accuracy of tube construction, the speed of operation and the efficiency required. Permanent magnets (420) are not dependent on an external power source (580), and are therefore safer than electromagnets (410). The failure of one magnet (420) will not cause the failure of the system. Reserve suspension force insures that the capsule cannot contact the tube wall (202).

Capsules (300) use magnetic suspension means to prevent collisions as two tubes are merged. The side of a capsule has magnets (420) that are all arranged with like poles facing outward. If due to a failure of the system two capsules attempt to merge into the same tube at the same time the magnets repulse in a unstable manner causing the capsules to adjust position as the merge (130) progresses.

Magnets (420) are oriented to suspend the capsule with the repulsive forces that they exhibit when oriented pole to like pole. More or stronger tube magnets (420) are placed where g loading is expected (for instance the bottom of a dip and outside of curves).

By using properly oriented permanent magnets (420) in the capsule (300) and conductive reaction plates (540) on the tube (200) suspension can be accomplished using the opposing magnetic field produced by the eddy currents formed in the conductor (540) in response to a moving magnet (420). This method is not as efficient as others unless the conductor (540) is a super conductive material. Heat is generated in the reaction plates (540) because of the induced current and resistance to that current. The resistance to the induced eddy current results in a force that resists motion. The use of a conductive sheet oriented normal to magnetic flux lines is to be avoided for efficient operation (unless a superconductor). Emergency breaking( ) can be effected in this way. When an expansion joint (240) is required the suspension force is maintained at a constant value in response to joint position by varying the field with magnets that move radialy outward from the tube center as the joint (240) contracts. Permanent magnets in the tube and a superconductive plate or coil in the capsule is advantageous in that it minimizes heat rejected to the capsule. Magnets (420) are concentrated near the ends of the capsules (300) to facilitate stability. Rare earth Magnets (420) can supply extremely high forces for their weight and are used in the capsule to save weight resulting in greater efficiency.

440 Gap Adjustment

The capsule may be fitted with ballast tanks (393) to enable precise weight and CG adjustments. Precise weight yields a precise gap size (445) (of consideration when permanent magnets (420) are used). If ballast tanks (393) are not used, and permanent magnets (420) are used the capsule is fitted with magnets (430) that can be reoriented to provide additional lift for increased load to keep the gap (445) between the capsule (300) and the tube (200) constant. Proximity sensors (440) are used to determine magnet (430) orientation and weight is thus calculated by measuring the position of the magnet (430). The orientation of these magnets (430) can be used to determine the pulse duration or amount of acceleration current thus keeping the acceleration of the capsules (300) consistent. Magnets are restored by ordinary means (450) known to those versed in the art when they exhibit a reduction in field strength.

Conventional wheel suspension may used for low speed (under 350 MPH) EET systems. Rolling resistance is minimized by using very stiff contact surfaces such as steel or ceramic, and eliminating seal and lubricant friction. Wheel bearings (460) can be rolling element, or magnetic. Ball or roller bearings using extremely hard materials like ceramics, carbides, or nitrides can be used with no lubrication or coolant. Magnetic bearings need no seals or lubrication and are suitable for higher speeds. Since operation is in an evacuated environment, contact seals are not required to keep contamination out. After every trip the bearings are fully inspected by automatic means such as a laser surface scan, temperature sensors, infrared imaging or other bearing inspection techniques known to those versed in the art. Any damaged or out of tolerance bearing is replaced. The bearing hub and spindle both have provision to receive a heat sink such as a sealed coolant chamber filled with a phase change coolant such as ice. The hot heat sinks are recycled with cold ones before every trip. The heat sinks have sufficient capacity to keep bearings within operating temperatures for the trip duration.

One or more load wheels (480) support the weight of the capsule (200). Guide wheels (470) may be used in conjunction with magnetic load suspension to enhance stability. Wheels of large diameter are more efficient and smoother. The contact surface of the wheel bears directly on the inner wall of the tube (200) or on a wheel race (track or groove) (490) affixed to the inside of the tube. The contact can approximate a single point, two points or a line. For long life and efficient operation the contact surfaces are made of a hard wear resistant surface such as steel, ceramic, carbide, or other suitable material known to those versed in the art. Accelerometers (841) in the capsule identify areas in the tube where the wear surface of the race (490) needs replacing. Wheel loads can be kept vertical by properly positioning the race (490) on the tube (200), causing the capsules (300) to bank the proper amount for their speed for curves in the tube (200).

Powering:

The capsule powering means (500) can be on board or off board the capsule. Onboard powering is not as desirable because of greater energy requirements to accelerate and decelerate the extra mass. Attractive onboard powering includes human powering, and electric traction motors used in wheel suspended capsules designed for combined in tube (low speed) and out of tube (street) use. The wheel (480) and race (490) can be conductive to power traction motors (505) on the capsule (200) or transfer electrical energy to or from the capsule (300). Brush type conductors cause drag so use is limited to low speed systems.

The preferred capsule (300) is a passive device in regard to power, the power source is not in the capsule but in the tube. This results in greater efficiency since the power and energy source does not have to be accelerated and decelerated. The capsule (300) is accelerated and decelerated within the tube (200) either by electric linear motor and/or electromagnetic projectile technology, or mechanically with traction wheels on the capsule (300) or the tube (200). Energy is converted to motion and consumed as a capsule (300) is accelerated. When the capsule (300) decelerates usable energy is generated. The ratio of energy production to consumption is the overall energy conversion efficiency. With careful design using proven methods known to those versed in the art, efficiencies over 90 percent are possible. With super conductor technology much higher efficiencies are possible. The energy lost is as waste heat, noise, fluid turbulence, or electromagnetic radiation. It is desired that the powering system (500) used should minimize the amount of heat rejected to the capsule (300). All else equal, powering systems (500) that reject most of the waste heat to the tube (200) are preferred to those that reject most of the waste heat to the capsule (300). A vacuum will not conduct heat. Waste heat rejected to the capsule (300) must be stored in a heat sink (380) until it can be removed, or raidiated to the tube. The temperature of the capsule (300) must be maintained at low levels consistent with life support requirements. Heat capacity is proportional to mass, thus capsule heating results in greater capsule weight and lower propulsive efficiency. Waste heat rejection to the tube (200) is cooled by ordinary means like; conduction to the out side of the tube (200), followed by convection to the atmosphere. For higher capacity cooling, liquid or evaporate means (550) are used to cool the powering devices (500) mounted on or in the tube (200).

Acceleration takes place by one or combination of 2 basic methods; mechanical interface (traction), and non-contact force field.

Mechanical acceleration means consist of a drive flywheel (522) situated with the axis perpendicular to the tube (200). The drive flywheel (522) is positioned so a capsule (300) traveling in the tube (200) will contact the periphery of the wheel (522) as it passes. As the capsule (300) is in contact with the wheel (522) an idler wheel (523) on the capsule (300) or tube (200) acts to force the capsule (300) against the drive wheel (522). The periphery of the drive wheel (522) is tapered in thickness from a thickness at a point near the center to a lesser thickness at the edge. A tapered lengthwise groove (530) in the side of the capsule (300) corresponds with the drive wheel tapered contact point (526). When initial contact between the capsule (300) and wheel is made the capsule speed matches the tangential speed of the drive wheel at the contact point. At initial contact the groove is at its widest and deep enough that the wheel mechanical interface groove outside diameter clears the bottom of the groove. As the capsule advances, the contact point moves outward along the radius of the wheel, accelerating the capsule. The contact point reaches the outside diameter of the wheel just as the capsule passes the wheel and engages the next drive wheel. The next drive wheel is turning faster or has a bigger diameter to mach the new capsule speed. The capsule alternatively may be fitted with the male interface and the wheel with the female (groove). Power is supplied to the drive wheels by any suitable means known to those versed in the art, or by decelerating capsules moving the opposite direction. Decelerating capsules transfer energy to the drive wheels in reverse of the acceleration process.

Electromagnetic coils (510) mounted on or in the tube wall use electric current to produce a propulsive force in magnets (420) or reaction plates (540) mounted on or in the capsule (300). Many different ways to switch and control the AC or DC electric current are known to those versed in the art. The coils (510) are controlled such that each capsule (300) accelerates at the determined time and rate to prevent collisions. Redundant sensors confirm desired capsule (300) position and velocity. If a magnetic flux return path (560) is used it should be of the non conductive or micro-laminated type to minimize eddy current losses.

If all capsules are the same launch weight the energy requirements for acceleration/deceleration are constant thus simplifying automatic speed synchronization. Other schemes yielding consistent accelerations are possible like; Proximity sensors determine magnet (430) orientation, weight is thus calculated. The orientation of these magnets (430) also determines the pulse duration of acceleration current, keeping the acceleration of the capsules (300) consistent despite varying weight. Sensors in the tube (200) determine the velocity of the capsule (300) and the pulse duration varied accordingly to keep the capsule (300) at the desired speed and merging phase location. The tube (200) is wired so that every capsule (300) is accelerated with the same speed and timing thus avoiding human and/or computer error. The energy required is generated on site or purchased from and sold to local power grids using any suitable source. Using a constant energy input during the acceleration phase (120) and limiting the peak acceleration to 3 g it will take about 100 miles and 3 min. to accelerate to a speed of 4200 MPH. A practical speed limit exists for every route (100), once the capsule (300) reaches the limit for the route (100) it simply coasts at extremely low drag until it is time to decelerate. No powering equipment (500) is needed within coast only zones (140). For very long coast zones the slight speed decay is compensated by additional acceleration. Within the cost only zones (140) it is desired to keep all conductors as far as possible from any magnets on the capsule. This avoids eddy current or EMF drag caused when a magnet is moved relative to a conductor. For long coast zones it may be necessary to add energy to some capsules to keep the spacing within tolerance.

Braking (600) takes place using the same equipment as powering except the direction of energy transfer is opposite. Redundant braking or backup braking is a safety measure in case of decelerating equipment failure. If insufficient energy demand or storage capacity exists to slow inbound capsules a backup breaking system automatically deploys. Initially excessive energy developed by decelerating capsules is directed to the power grid. If the grid cannot absorb the excess it is directed to storage. If insufficient energy storage capacity is available the energy is wasted by heating water or air. If insufficient cooling capacity is available, (as a last resort in emergency) air is let into the tube to provide aerodynamic braking. To minimize waste it is better to limit inbound capsule traffic to match the demand or storage capacity for energy. Inbound capsules are not started at the other end of the tube if the capsules energy cannot be used, stored or wasted. In the event energy is wasted, the temperature of the coolant is monitored. If coolant temperature exceeds a predetermined limit no more capsules are allowed into the tube at the other end. In case of total system failure air is automatically let into the tube. If the velocity of an inbound capsule is still too high eddy current arrestor plates are automatically deployed. Arrestor plates deploy if the emf from magnets on the capsule exceeds a threshold value dependent on capsule speed only. The arrestor plates are normally perpendicular to the capsule and cause no breaking unless activated by a pulse exceeding a threshold value. When activated the conductive plate pivots so the plate is parallel with and in close proximity to the capsule magnets. EMF induced current in a deployed plate exceeding a pre-selected value is sufficient to open the air intrusion valves, if system failure occurs.

Capsule spacing is a function of braking. A breaking wave is used to force capsules into proper spacing and timing. If a capsule reaches a point in the tube to soon, braking is increased, if the capsule is late no breaking takes place until the capsule catches up, the braking wave will push a capsule along that has lagged behind its proper position with respect to time.

Capsule spacing is a function of acceleration, an acceleration wave is used to force capsules into proper spacing and timing. If a capsule reaches a point in the tube to soon, acceleration is decreased. If the capsule is late no acceleration takes place until the wave catches up to the capsule. The deceleration wave will push a capsule along that has lagged behind its proper position with respect to time.

The energy wave moves along the tube according to desired capsule motion. Each wave caries a capsule from beginning to end. The wave frequency corresponds to capsule frequency. Capsule frequency is a constant unless doubled or halved by a merge or divide. Wave length is determined by the wiring, it is a function of tube position along the route. The wave propagation velocity is a function of wave length and frequency and thus tube position. Thus the capsules ride from beginning to end in "slots" between the waves. If a capsules momentum caries it toward the front of the slot energy is extracted from the capsule, slowing it down. If the capsules momentum causes it to move to the back of the slot, energy is used to accelerate the capsule. Capsule timing in a merge is assured by timing the "slots" in each tube out of phase. This forms a new wave or capsule frequency that is doubled.

The capsules have a magnet on board that can change polarity North out or in), the polarity of this magnet is determined by the phase of the tubes before the merge. After the merge every other capsule slot is of the same polarity and consecutive slots will have capsules of opposite polarity. The capsule polarity is used when division takes place to cause the capsule to switch to the tube having the proper phase. The polarity of the capsule creates a bias force when the capsule is in a divide zone. The bias force causes the capsule to be repelled from one side and attracted to the opposite side of the tube according to the capsules polarity. The capsules in every other slot divide automatically because of alternating polarity. The polarity of the capsule cannot be changed once the capsule is placed in a tube. A capsule with improper polarity will not be accelerated if the polarity is improper. Multiple orders of polarity are possible, enabling switching to different routs or siding with terminals. The radial positions of the polarity magnets determine the order. Magnets in the tube only have effect on a capsule if the alignment or order of the magnet is such that they are aligned. Other orders are ignored. (A second harmonic polarity function that is changeable in route can be used to vary the course but the first order polarity takes precedence). If the capsule polarity is improper the departure airlock hatch and tube door will not operate. The capsule frequency is such that capsule spacing is great enough to allow an "error" capsule to fit in between successive capsules with room to spare. This limits the chance of an accidental collision in the event of a failure of the polarity magnet, or other mishap. If a error capsule occurs it is pushed into a slot with the capsule in front or the one behind, then it is known as a double. A double looses polarity and assumes the polarity of the contacting capsule. Flags are set and the cause of the error is determined and corrected. Capsule polarity can be determined strictly by mechanical means for low speed mechanical systems. A finger can be extended from the capsule to catch a switch activator.

Terminal 700

Many different terminal (700) possibilities exist. Terminals (700) can exist at the end of a tube (200), or along its length. The main function of the terminal (700) is to service, load and unload the capsules (300), and to prevent air and other impediments to transport from entering the tube (200) as loading or unloading occurs.

The necessary elements at a ETT terminal (700) are much the same as an airport or rail station. Baggage (920) is loaded by the passenger (910) below the seat (362) or in a rack for the purpose. If additional baggage (920) is carried additional fare is paid and the baggage (920) is loaded in as cargo (950) or ballast in the same capsule (300). Baggage transport is eliminated by having the loading bays (765) extended into the parking areas (701) or using moving walkways (703). Fee collection devices (702) are located prior the security detector (705) to limit fee avoidance and reduce pedestrian traffic inside the terminal.

Airport type security devices (705) and methods provide safety to the occupants. Access to the evacuated tube (200) and terminal (700) mechanisms is controlled with standard high security measures like those employed at nuclear plants.

The deceleration siding (708) is divided off the main inbound tube (200) by a switch (707) to provide a siding to remove the capsule from the tube or unload the capsule. In the deceleration tube (708) is a check valve (710) that prevents significant amounts of air from entering the tube in the event of an airlock (712) failure. The air lock (712) is located in or at the end of the deceleration siding (708). The airlock (712) can be a partial or transfer lock (712*t*) for loading and unloading or a full lock (712) to remove a capsule (300) from the tube (200). The airlock (712) consists of; a tube door (714), a tube door seal (716), a transfer hatch (722) and a transfer door seal (724), a purge volume (720), and sensors, controls, and capsule handling means. A purge pump (719) or purge piston (721) are used to purge the air from the empty lock (712) to make it ready for the next capsule.

A full air lock (712) consists of a tube door that defines a capsule containing volume (720) when closed. The tube door (714) can operate by any known means such as but not limited to; ball type, swinging gate type, sliding gate type, iris type, radial segment type, etc. The tube door is sealed against air intruding the tube (200) with a static or dynamic seal (716). A backup seal (717) provides redundancy in case of seal failure. The seals can be of any suitable type, material or construction known to those versed in the art, such as; retractable pneumatic or hydraulic actuating type, etc. The purge volume (720) is shaped to contain the capsule as exactly as possible. Clearance is minimized to reduce the amount of air that must be removed at each cycle of the airlock (712). The airlock interior is equipped with sensors to provide control information. The capsule position sensor (842) indicates capsule position in the airlock. The pressure sensor indicates absolute airlock pressure by any suitable means. The acoustic sensor (846) listens for failure emissions of the capsule, airlock, and seals. Air ports (718) communicating with the purge volume admit or extract air. Limit switches (726) or other suitable means control the timing and opening and closing of doors, hatches, and handling equipment. If a displacement piston (721) is used to purge the volume, it can use a sliding seal (721.3) or a rolling sock type of seal (721.6) to allow for the linear displacement and minimize leaks. The displace piston (721) is faster and more efficient than a vacuum pump to purge the airlock volume for the next capsule. The energy use is balanced with a displacement piston (721) on the outbound and inbound airlocks.

The capsule its self can be used as a displacement piston (721). A sliding seal is at the end of the capsule that is toward the tube side of the airlock chamber. The airlock is evacuated by pulling the capsule out of the arrival airlock against atmospheric pressure. Most of the energy to extract the capsule is derived from energy gained by placing an outbound capsule in the outbound lock (712). The energy required to overcome dynamic seal friction and leakage must be added. To avoid dynamic seal losses, the inbound lock (712) is arranged above beside or below the outbound lock. The purge volume (720) for both locks can be exchanged so the outbound purge volume (720) is exchanged with the inbound purge volume (720). To accomplish the exchange additional doors (714) are used for the tube ends to prevent air intrusion as the exchange is performed. In this way inbound capsules enter a evacuated arrival airlock (712), at the same time a outbound capsule enters the flooded outbound lock (780). The outbound capsule displaces the air as it is placed in the outbound lock. All doors and hatches close on both locks, with a capsule in both locks. The outbound lock (780) is evacuated to tube pressure (a vacuum), at the same time, the inbound lock (712) is brought up to atmospheric pressure. When the locks are at the appropriate pressure the tube door (714) opens in the outbound lock (780) and the hatch to the atmosphere opens in the inbound lock (712). The capsules are removed from the locks, and the door (714) and hatch (722) are both closed. Now the locks are exchanged so the inbound lock becomes the outbound and the outbound becomes the inbound. Thus the inbound lock (712) is now purged to receive a inbound capsule and the lock at atmospheric pressure can be opened to receive a outbound capsule. The cycle continues as long as an outbound capsule is available every time the locks are cycled for an inbound capsule. The means of exchanging the lock can be accomplished by a rotation about an axis parallel to the tubes and at the mid point between the centerlines. Instead of two or more rotatable purge volumes, a single sliding volume may be used. The airlock purge volume is moved between the outbound and inbound locks (the cycle time is greater). When the capsule is used as the displacement piston, the fit in the lock determines the volume of air that must be purged by a vacuum pump (719). A close accurate fit results in minimal time required to cycle the lock.

The capacity of the system is determined by; capsule size, the minimum tube velocity, the minimum capsule spacing, the number of locks and the cycle time per lock.

Partial or transfer airlocks can use the capsule as the tube door. Capsule restraint (728) means prevent atmospheric pressure from forcing a capsule (300) into a tube (200). The emergency escape hatch (730) functions the same as the escape hatch in the tube (200).

A seal (790) is required between the atmosphere and the tube interior (201). This seal (790) can be static or dynamic. Static seals (792) are more efficient and safer than dynamic seals (797). A dynamic seal is limited to use in low speed or partially evacuated systems. In most instances static seals (792) are preferred to dynamic seals (797). A static seal is defined as a seal with no motion between the sealing surfaces and the seal. The use of static seals (792) requires an air lock chamber (720) having a hatch (722) to the atmosphere and a door (714) to the tube interior (201). The doors must effect a seal when closed. Many different schemes for utilizing a static sealing system are possible. All of these schemes involve either a capsule (300) being moved completely into the air lock chamber (720) or partially into the air lock chamber (720). The capsule (300) its self can be used as the air lock chamber to tube door (714). If the capsule (300) is only partially in the air lock chamber (720) when the chamber is opened to the atmosphere it must have a seal (716) between the inner chamber surface and the external capsule surface; and a means of preventing the atmospheric pressure from pushing the capsule (300) out of the chamber (720) when the air lock (712) is opened to the atmosphere. The use of the capsule (300) as the door (714) has the advantage of less chamber volume to purge and fewer parts required. The disadvantage is that the capsule (300) cannot be completely removed from the tube (200). To allow for the capsule (300) to be removed from the tube (200) a tube door (714) is used to seal the tube. The capsule (300) can be removed from the tube (200) as needed for service. Routine service can take place without removing the capsule (300) from the tube (200). Air allowed into the air lock chamber (720) during loading or unloading is excluded when the doors to the tube (200) and capsule (300) are closed. The volume of the air lock chamber (720) is kept close to zero to reduce the energy required to evacuate the air lock chamber (720) prior to capsule (300) release.

Many parallel air locks (712) are used to maximize tube (200) capacity. Capacity is added as needed by installing additional air locks (712) until the transport capacity of the tube (200) is reached.

Transfer port airlocks are the most efficient since the purge volume in minimized or nearly eliminated. Since the capsule remains in the tube the ports must be used to conduct all routine capsule service. Transfer ports are arranged in parallel, serial or hybrid arrangements. The escape hatch (730) system described previously is a transfer port. A transfer port is arranged and located for normal convenient use, a escape hatch may not be. A parallel arrangement uses many switches to allow random access to the tube. A parallel arrangement may use a full lock, a partial lock or a transfer port. A serial lock arrangement is a segment of tube where the capsules are stopped together in a batch like process much as a train would stop in a subway. Two or more such serial segments arranged in parallel offer continues service of a tube. While one serial segment is in use the other is filling with capsules, by the time all capsules are loaded and disembark, the other segment is filled. The serial segments are used to unload and to load. This is a batch type process. A turnaround provides access from an inbound tube to an outbound tube.

A security violation station (735) has all the provisions of the arrival bay, plus security means such as locked and secure doors and armed security personal. The security violation area (735) is located away from the main terminal (700) and sensitive components. Security and safety are enhanced by cameras (856) stationed along the tube (200) and in every capsule (300). These cameras (856) provide security personnel and occupants with a view of the tube (200) and the surrounding landscape. The ETT capsule cannot be hijacked because the route (100) of travel cannot be varied, and all controls are automatic.

A medical emergency station (740) has all the provisions of the arrival bay plus medical emergency equipment and personal. An emergency bay combines the medical and security violation functions.

When full airlocks are used, a conveyer (745) or other means is used to transport capsules from the arrival airlock to the departure airlock. Automatic robotic means are used to manipulate the capsule and unload the cargo or module at an unloading station (750). The unloading station (750) is where cargo or persons are unloaded from the capsules. The unloading walkway (703) moves at the same speed as the capsule conveyor.

The service station (755) consists of a: wash (756), rinse (757), dry (758), inspect (759), and component service (760) areas. Life support module (350) inspection and service is provided for; cooling and temperature control, pressurization, air quality, virtual reality, data systems. Capsule storage (762) space is available to adjust for temporary travel imbalances.

The loading station (765) is where cargo or persons are loaded in the capsules. The loading walkway (703) moves at the same speed as the capsule conveyor. The departure airlock (780) is the same as the arrival airlock (712) except the direction of capsule movement is reversed. Energy is generated as air or a capsule is admitted to the evacuated purge volume (720) of the departure airlock (780).

The acceleration siding (770) is the same as the deceleration siding (708) except the capsule direction, acceleration and energy flow are reversed.

Many systems are required as will be appreciated to those versed in the art. The ETT maintenance system includes specialized equipment to meet the special requirements of the ETT system. A tube maintenance capsule (812) is used to maintain components inside the tube without admitting air. This special capsule (812) used an expanding seal to effect an airlock within the tube. A large hatch in the capsule (812) opens inward to service components inside the tube without letting air into the tube. Capsule (300) traffic is suspended when the maintenance capsule (812) is in use. A tube maintenance airlock (814) is used externally on the outer surface of the tube to service the inside of the tube through access hatches (207) without admitting air. Some service or repair procedures can be accomplished in this fashion without suspending traffic. Leak detectors (816) (ultrasonic or otherwise) locate leaks for repair. System evacuation is accomplished with ordinary evacuating equipment (830) known to those versed in the art. Once the air is removed it is prevented from re-entry into the tube (200) by seals (790), vacuum pumps (830), and/or fluidic devices.

The data system (835) consists of all sensors (840), a data link (860), a computer (870), and a database (880).

Data system sensors (840) include: Position sensor (842) for the capsules (300) the tube (200) and all moving equipment. Load sensor (844) on tube supports (220) and in the capsules (300) and other areas where load information in needed. Acoustic sensor (846) are used to locate leaks and detect failure sounds before catastrophic failure occurs. Laser sensor (848) mounted on the tube signal the presence of capsules, and indicate tube alignment. Absolute pressure sensors (850) are used along the tube and in airlocks and life support systems. Air flow sensor (852) show normal and abnormal airflow. Temperature sensor (854) measure all critical component and coolant temperatures. Security sensors (855) include; video (856), audio (857), motion sensor (858), weapon sensor (705), explosive sensor (705), etc.

The data link (860) is accomplished by any known means such as radio, optical, infrared, fiber optic, or wire connection.

The computer (870) collects, interprets and stores all data in database (875) files. Databases (875) are kept for all data pertaining to the; route, tube, capsule, terminal, energy, vibration, temperature, pressure, security, financial, maintenance, etc. All critical parameters in the database are monitored continuously. The computer continuously monitors data and controls the systems to keep all systems functioning. An alarm system (880) is activated if vibration, energy, security, vacuum, temperature, failure, medical, etc. parameters exceed norms. Capsule loading is suspended if an alarm sounds. The computer (870) operates the control systems (885) for the; tube, capsule, terminal, alignment, suspension, energy, cooling, timing, vibration control, security, etc.

Operation of the Preferred Embodiments:

Low Speed System:

A commuter ready for a day at the office 500 miles away, confirms the usual daily destination on a computer touch screen in the foyer of their home. A security code is entered and a hatch opens. The commuter puts any baggage under a seat in a small 4 seat capsule in the airlock. The hatch on the capsule is closed, the airlock hatch closes and locks. The airlock is evacuated. Sensors confirm no leaks. The tube door opens and electric motors acting through rollers move the capsule toward the main tube. The capsule is suspended within the tube on wheels at the fore and aft of the capsule. The wheels are narrow gauge and operate in tracks or grooves in the tube. The wheels are inspected automatically. Any degradation in the bearing surfaces is cause for repair. A capsule in need of repair is rejected and the Tube door will not open. Acceleration motors are controlled to time the capsule to enter the next sensed open space in the tube. The motors accelerate the capsule to about 60 mph. Travel proceeds for 2 min and the speed is increased to 120 mph as the tube merges with another. Travel proceeds smoothly and quietly for another 12 min. Deceleration indicates arrival at the area terminal. The deceleration is accomplished by large diameter successive fly wheels operating at the approximate speed of the capsule stream. The tubes are divided into two as deceleration nears 60 mph. The capsule is diverted to a siding tube where an airlock is available. The capsule is inspected as airlock seals deploy, and the clearance is flooded with air. The outer hatch opens outward. The commuter's capsule hatch opens inward. The commuter collects baggage and exits. The capsule is prepared for the next trip. Total time less than 15 min., distance 25 miles. The commuter is whisked to the desired high speed departure area by a moving walkway.

High Speed System:

A commuter (910) arrives at the terminal (700) via any transport means. The individual doing the travel is in complete control to select and board a capsule (300) bound for the desired terminal (700). Signs direct the commuter (910) to the loading area (765) for the desired destination. If arriving by car (960), the commuter parks in a secure parking stall (701) next to a moving walkway (703). The commuter loads any luggage onto the walkway (703). Weapons and explosives sensors (705) determine that the commuter is not a threat to the integrity of the capsule (300) or tube (200). The fare is collected by any appropriate means (702) such as the swipe of a debit card. The walkway (703) carries the commuter (910) and luggage (920) to the first available capsule (300) made ready for loading. The commuter (910) stows any luggage (920) and takes a seat (362) in the freshly cleaned seating module (361). When loaded, the module doors close. To facilitate safety, the door mechanism is equipped with sensors that prevent closing until clear, and indicate improper closure. If the door is not closed it is impossible to enter the capsule hull (310). Once in the capsule (300) it is impossible to open the door.

The module (360), once filled to capacity is automatically loaded with cooling ice (386) and any ballast (925), and inserted into the capsule (300). The hatch (320) is secured, sealing the capsule (300). Air quality in the capsule (300) is maintained at ambient levels by removing co2 and adding o2. Temperature is maintained by varying the heat flow from the interior of the capsule (300) to the cooling ice (386) located in the cooling hoppers (382). Virtual reality headsets or other display provide the commuter (910) with a choice of news, scenery along the route, or other entertainment, or communication. The loaded capsule (300) is loaded into the airlock (780). The airlock hatch (722) is closed and sealed. The air is purged from the airlock (780). Sensors( ) monitor the pressure in the capsule (300). If capsule pressure decreases as the airlock (780) is purged a leak is indicated and the capsule (300) removed to correct the problem. The door (714) to the tube (200) cannot be opened if positive pressure exists in the airlock (780). The airlock (780) can only be purged of the expected volume of air. If any air leaks into the airlock (780) from the capsule (300) or the atmosphere the pressure remaining in the airlock prevents the tube door (714) from opening until the leak is fixed and a normal cycle is accomplished. With the airlock (780) purged the door (714) to the acceleration siding (770) opens. The capsule (300) is ejected into the acceleration siding (770). Sensors( ) determine when the capsule (300) is clear and the tube door (714) automatically closes to provide an air lock (780) for the next capsule (300).

Normal internal pressure inside the capsule (300) prevents the opening of capsule (300) while in an evacuated environment. Emergency escape hatches (347) can only be opened if the tube (200) looses vacuum, or the capsule (300) is stopped concurrent with an escape hatch (207) and an emergency airlock deployed. Escape from an evacuated tube (200) is effected by bringing the capsule (300) to a stop under an access port (207) and activating an emergency seal (790). The seal (790) inflates locking the capsule (300) in place and sealing a segment of the tube (200) thus providing an air lock. Air is allowed into the gap between the tube (200) and the capsule (300). The escape hatch (347) is opened to the inside of the capsule (300) and the tube hatch (207) is opened outward. Normal operating pressure and vacuum prevent these hatches from opening during operation. The emergency hatch (347) is on the top of the capsule. A clear window is located in the hatch (347) arrows on the inside of the tube (200) and visible through this window point to the nearest escape. The capsule (300) is maneuvered to the nearest hatch (207) by manual or onboard means. The capsule (300) must be stopped in the tube (200) prior to emergency air lock activation.

The capsule (300) is suspended within the tube (200) magnetically (or on wheels (480)) and awaits launch. Sensors (440) on the capsule (300) and/or in the tube (200) determine the capsule load by measuring the gap (445) at both ends. Adjustable magnets (430) even the suspension gap (445) according to capsule load and its distribution. Pulse timing and duration of current to or the load across acceleration/deceleration coils( ). Electromagnetic acceleration pulses are periodic so the capsule can safely merge with other capsules (300) accelerating in the tube (200). The acceleration pulse cannot proceed until a vacant space (388) in the tube is available, thus preventing any collision. The capsule accelerates at the predetermined rate. The local power grid (580) is called upon to provide the energy required during periods of increasing demand or to utilize the excesses produced when demand for service is declining.

Merging can take place providing the following conditions are met: A) The capsules (300) in the two tubes (200) must be at the exact same velocity; B) there must be at least a capsule length of spacing (388) between the capsules (300) in the two tubes (200) to merge; C) the capsules (300) in the two tubes (200) must be staggered such that the space (388) between capsules (300) in one tube (200) corresponds with the capsules (300) merging from the other tube (200). This is done by out of phase timing of acceleration waves.; D) Before capsules (300) in the merged tube (200) can decelerate below the velocity at merging, division of every other capsules (300) into two tubes (200) must take place.

The occupied capsule seats (362) tilt on pivots (363) in response to acceleration, allowing the acceleration force to be transferred to the commuter (910) in a comfortable direction. Because of the vacuum isolation the capsule (300) accelerates is near silence. When top speed is reached the capsule (300) coasts smoothly along. Slight vibration is the only indication of motion. The smooth ride is maintained by active and precise alignment (230) of the tube (200). Low frequency vibration is caused by variation in tube straightness. High frequency vibration is due to local variation in suspension force. When sensors (440) in the tube (200)

determine that capsules (300) are not centered in the suspension gap (445) the tube is moved by alignment actuators (234) to cause the gap (445) to be uniform. If optical tube alignment sensors (232) and capsule suspension gap sensors (440) disagree, it means that either: the tube magnets (420) are supplying an out of tolerance force to the capsule (300); or that a sensor (232 or 440) is defective. This signals the tube location for inspection and repair. If only a single capsule (300) is observed to have an out of tolerance suspension gap (445) that capsule (300) is defective or improperly loaded, it is flagged for inspection and repair.

Vibration and Resonance Control Sensors:

Natural frequencies of the capsules suspension and the tube deflections are all known and can be varied to avoid any resonance from exciting sources. When levels of vibration are sensed that are out of tolerance, the natural frequency is varied to reduce the vibration, the cause or exciting frequencies are identified and varied and as a last resort capsule speed or frequency is varied to keep all vibrations within tolerance.

The natural frequency of tube flex between support spans is varied by adding or moving weight to the center of the span. The weight is moved by mechanical means, or fluid is pumped into tanks. Radial resonance is driven by capsule spacing frequency. Radial control is to vary the capsule by known random amounts. Longitudinal resonance is largely caused by breaking, or acceleration forces and to a lessor degree longitudinal components of curvilinear forces. To limit longitudinal resonance the tube weight can be varied by discussed means, the capsule frequency varied. Torsional tube vibrations are caused by off center supports, curvilinear forces, or capsule torsional motion. The support points can be adjusted, or weight added or removed from the tube etc.

Tube alignment can cause and effect capsule vibrations, as discussed in another section.

Capsule natural and speed related frequencies relate to the suspension spring constants, capsule structural constants, and the weight of the capsule. The yaw, pitch, roll, radial, longitudinal, flexural, and radial frequencies are all variables having effect on interrelated tube vibrations. The capsule spacing frequency or timing can be staggered or randomized within established known patterns and to maintain a design average. The magnet/coil spacing frequency can also be given a randomness between certain limits related to efficiency to limit resonance. Pulse energy can be varied slightly between coils to change the driving frequency harmonics without affecting the average energy output or acceleration force. Expansion joint induced variation causes inconsistencies dependent on temperature. Expansion joint gaps form when the tube cools or contracts causing a reduction in available suspension force per linear distance. The suspension force is minimized with magnets that move radialy inward to compensate for the reduction in linear density as any contraction takes place. The magnets move radialy out as expansion occurs to maintain consistent suspension force. Cargo/passenger movement is mitigated by active sensing and moving counter weights or by restricting possible movement to tolerable quantities. Passengers moving rhythmically or in unison at a natural frequency is a possibility that can be mitigated largely by education, and legislation designed to limit destructive passenger actions. Warnings are automatically issued to stop motion if sensed. As a last resort, if nearing the tolerance threshold a tranquilizer injection or gas is administered to offenders. Restraint nets, harnesses or bars limit a passenger's motion, thereby limiting center of gravity change.

If satisfactory results cannot be achieved with active driving frequency modification then, active means of vibration control are used such as counter rotating masses that can be oriented and varied to actively cancel vibrations.

Tube dampers and capsule suspension dampers are employed as a as needed, but their use can causes unrecoverable energy loss.

Tube evacuation is aided by capsules (300) moving through the tube (200). The maximum capsule speed increases as the tube (200) is evacuated to a greater degree. The state of evacuation is maintained at its optimal value by using the capsules speed to remove air. Air tends to build up in the pocket (325) at the capsule end (320). An evacuation valve (327) allows this air in to a high vacuum chamber (329) in the capsule (300). The higher the design speed the greater the degree of evacuation, as desired.

The speed of capsules in coast zone limited to the speed of the slowest capsule in that zone. As a capsule passes a known point the velocity is checked, if the velocity is less than preceding capsules all successive capsules are limited to that speed, the slow capsule is removed upon arrival, the system cannot operate at top speed again until the slow capsules are purged, if the speed is to high the capsule is slowed to the desired speed, and the departure and acceleration zone checked for malfunction. This is done by measuring the distance between capsules at known check points. If the distance is under tolerance the capsule receives breaking pulses, until successive checks show no further degradation in spacing. A capsule is delayed from starting or a space left to allow the speed to regain.

If power is available (and at greater expense) in coast zones acceleration pulses can be used instead of deceleration pulses to control capsule spacing. The advantage is that speed can be maintained. The breaking pulse method of control is used as a passive redundant measure if power fails.

Deceleration commences at the predetermined location. When the capsule (300) enters the deceleration coils (510), electricity is generated in the coils by the magnets (420) or deceleration plates( ) in the capsule (300). The energy liberated from the decelerating capsule (300) is absorbed by an accelerating capsule (300) in the opposite direction, the utility grid (580), stored in a usable form, or as a last resort released in the form of heat by shunting the coil (510) across a resistive load (615). Enough water is on hand to ensure the cooling of the resistors (615) and guarantee that all capsules (300) can be decelerated. In case of a failure of the deceleration circuit, eddy current plates (610) automatically deploy to slow the incoming capsules (300) in a passive manner.

If any illegal activity or medical distress has been monitored the capsule (300) is directed to a secure area (735) where security and emergency personnel and facilities await. Any attempt to use a capsule (300) illegally is stopped by having a secure area where the capsule (300) with the offending person on board is directed and apprehension made. The capsule interior (361) is divided to minimize opportunity to take hostages. Any tampering with the capsule monitoring camera (856) or its view results in the capsule (300) being automatically directed to security (735) upon arrival. This same system is also used in case of medical emergency in route. The occupant (910) in distress signals the emergency and upon arrival to the terminal (700) is directed to a medical emergency area (740). If a sensor (855) detects a emergency that could threaten the integrity of the system all loading of capsules( ) is suspended. All capsules( ) in route are unloaded upon arrival to the nearest terminal( ) and operation suspended until the problem is corrected. Capsules bound for a terminal having problems are redirected and stopped at an alternate location( ) if available.

Upon arrival at the destination terminal (700) the capsule (300) is diverted to the first available airlock (712). The capsule is smoothly decelerated to a stop in the arrival bay (720). Sensors indicate the arrival of the capsule in the airlock (712) allowing the tube door (714) to close. With the door (714) closed any leak that has developed from the capsule (300) will show up as a pressure rise in the airlock (712), flagging the capsule (300) for repair. The tube door seal (716) is monitored as a measured amount of air is allowed into the airlock space. If the airlock fails to reach atmospheric pressure the tube door seal (716) is defective and a backup door( ) and seal( ) is deployed. With the airlock (712) at atmospheric pressure the airlock hatch is opened. A conveyer (745) moves the capsule (300) from the arrival airlock (712) to the unloading bay (750). The hatch closes and air is purged from the airlock by any suitable means such as vacuum means or a displacing piston actuated by mechanical means. The capsule can be fitted with dynamic sealing rings on the outside diameter to purge most of the air from the airlock as the capsule is extracted. The energy required to purge the arrival airlock is recovered from the energy received when air or a dynamically sealed capsule is admitted to the departure airlock.

The capsule (300) is equalized to the atmospheric pressure with an equalization valve (323). This valve (323) is impossible to operate while in an evacuated environment. Positive pressure, less than the lowest possible atmospheric pressure but greater than the lack of pressure in the tube, acting on the exterior of the valve (323) enables operation. Any steam and melted cooling water is released to the wash down system (756). The temperature of melted cooling water (386) is measured, if out of tolerance the capsule (300) is flagged for repair. If successive capsules (300) are also hot the acceleration or deceleration circuit is faulty, or the capsules (300) are overloaded or under cooled indicating a fault with the charging or loading sensors( ) ( ).

The capsule hatch (320) is opened and the seat and life support module (360) is extracted. If the capsule hatch (320) should be inoperable for some reason, the emergency escape hatch (347) can be opened from the inside. (If automatic opening fails in the loading bay (750) after the pressure is equalized). After module (360) extraction the module doors( ) open and the occupant (910) gets out and collects any luggage (920). Total time 15 min, top speed 3600 mph, total distance 400 miles. The acceleration and deceleration cover about 100 miles and take about 3 min. each.

After the occupants (910) disembark, the conveyer (745) moves the capsule (300) and module (360) (C&M) to the wash down station (756). The C&M are washed with the rinse water( ) Detergent( ) is injected into the hot rinse water( ) and it is used for wash water( ). The C&M are rinsed by steam/hot water( ) vented by arriving capsules (300). The C&M are dried by waste heat from the tube and capsule coolant.

The conveyer (745) moves the C&M to the service station (755). Automatic inspection (759) of the C&M is a necessary safety measure. All parts that are critical to the safe operation of the system are automatically inspected and tested prior to each use. The capsule doors( ) and seals( ) are inspected. Any out of tolerance components are taken out of service for repair. The capsule (300), seat module (361) and life support system (350) are inspected, and serviced or removed for any repair deemed necessary. The CO2 scrubbers (356) are exchanged and O2 (352) added to the life support module (350). All sensors are tested. The suspension system (400) is inspected and tested. The pressure hull (310) is inspected and tested for structural integrity. Optical, acoustic and thermal sensors completely scan all stressed parts. Every capsule's and module's service records and statistics are automatically updated with all acquired data. Onboard acoustic sensors (846) record during pressure cycles to sense any fatigue. All data is stored both in the capsules on board database (370) and in an external database (875) according to an identification number (330) permanently affixed to the capsule (310) and module (360). The identification number (330) is readable by automatic means (330) such as a laser scanning a barcode.

The conveyer (745) moves the serviced and inspected capsule (310) and module (360) to the loading area (765). The capsule (300) is now ready for return occupants (910). The ready capsules (300) are available for loading in multiple parallel bays (765). If inbound capsule traffic exceeds outbound, the extra capsules (310) and modules (360) are placed in storage (764), or used for cargo (950) or energy storage or transport. If outbound exceeds inbound, any previously stored capsules (300) make up the difference.

For efficient, simple, stand alone operation it is desired that for a given route (100) the traffic in both directions be exactly equal. A capsule (300) starting the acceleration phase (120) as another capsule (300) traveling the opposite direction enters the deceleration phase (170). Extra energy is added to overcome the losses due to electrical inefficiencies. If the demand for service is not equal in both directions; either fares could be adjusted to equalize the demand, or empty or ballasted capsules (300) could be sent if no other cargo (950) where available. Another way that unequal number of capsules (300) could be accommodated is cooperation with the local utility grid (580) and another route (100) terminating at the same location (having an opposite demand imbalance). At constant energy acceleration the heating due to inefficiencies is concentrated toward the tube ends. Liquid cooling is used with an ethylene glycol water mixture. The heat is used to supply hot water to the terminal facilities and to wash (756), rinse (757) and dry (758) the capsules (300). If all of the heat generated cannot be used at the terminal (700) it can be sold for use at adjacent hotels.
Medium Speed System:

(Our commuter still has 75 miles to go). The system is a hybrid system that uses mechanical suspension on precision ground and polished carbide surfaced wheels operating on an angular contact carbide race. The bearings are magnetic and require no drag producing seals. The propulsion is by electromagnetic means, using eddy current propulsion and breaking. The wheels and drive plates/coils are cooled while the capsule is stopped for loading/unloading. Aluminum is used for the wheel structure for light weight, heat sink and transfer. The tube alignment is semi automatic, load cells sense capsule positions with unusually high loads. This indicates an alignment problem. Measurement and adjustment are conducted by a maintenance operator watching over the system. The trip takes 15 min at a top speed of 300 mph. Acceleration and deceleration each take about 20 seconds and cover about a mile. Acceleration and deceleration are accomplished electro-magnetically with a linear induction motor.

As will be apparent to those versed in the art; many other possibilities and combinations of known technologies result in a ETT system. The specifics of materials, methods, and devices listed herein shall not be construed to limit the scope of the present invention.

DESCRIPTION AND OPERATION OF ALTERNATE EMBODIMENTS

A dynamic seal (892) is defined as a seal where relative motion occurs between the surfaces being sealed. The seal (892) operates between the evacuated portion of the tube( ) and the capsules (300) traveling through the tube (200). The seal (892) prevents air and other impediments from entering the tube as the capsule (300) is taken from the tube (200). A dynamic seal (892) is not 100 percent effective at excluding air or dust from the system. The amount of leakage past the seal is removed by a vacuum device (830). More than one seal (892) can be used in series to increase effectiveness and reduce vacuum requirements. A contacting dynamic seal (892) is subject to wear and must be periodically replaced. A non contacting dynamic seal (894) aerodynamically excludes much of the air and dust from the tube. Electrostatic charge improves non contacting seal (894) performance. Several seals (892) in series provide the necessary effectiveness. The friction of the seal (892) and the atmospheric pressure must be overcome to extract the capsule (300) from the tube (200). This reduces the efficiency of the system. Capacity of a tube (200) using a dynamic seal (892) is determined by the length of the capsules (300), the maximum seal surface speed and the rate that leakage can be removed by vacuum pumps (830). Maximum seal speed is determined by the maximum surface speed the seal's material will take without excessive wear or failure. It is estimated that the maximum dynamic seal speed is around 2000 feet per min. yielding a tube capacity of around 100 to 300 capsules per min. depending on the capsule (300) size. The capacity per tube (200) then is equivalent to 3 to 9 lanes of freeway. Capacity of a tube (300) could be doubled by merging 2 tubes that have been accelerated to at least twice chute speed. The capsules (300) in the tubes (200) to be merged are out of phase with each other. At the other end of the tube (200) the capsules must be divided into two tubes (200) to avoid exceeding the maximum safe seal surface speed. The capsule (300) is then moved toward the loading chute (898). Parallel lines are brought together as they are accelerated to chute speed. The capsules are brought close together perfectly fitting end to end to exclude most of the air between the capsules. Seals (899) between the capsules (300) combined with onboard vacuum system (830) can be used to reduce tube (200) evacuation requirements. A backup seal (896) is in place for deployment should the main seal (892) fail. The seal (892) can be replaced while the ETT is in operation. A door (897) for the chute (898) is only required if a capsule (300) is not in the chute (898). If service is to be suspended for any reason the chute (898) is blocked with a regular fully ballasted empty capsule (300). The main advantage of the dynamic seal (892) is lower cost for a low to medium speed route (100).

Local low speed service can be provided with out any powering coils (510) in the evacuated tube (200) dramatically reducing cost, the energy provided by the atmospheric air forcing the capsule into the tube the only energy requirement would thus be the energy to extract the capsule from the fully packed tube (200), through the seal (892) against the atmospheric pressure, maintain the vacuum, and overcome the seal drag and slight suspension drag. The maximum speed capability determined by the capability of the air seal (892). The speed could be doubled by powered devices( ) that merge two such non powered tubes together (with a synchronizing device) and then divide them to half their speed for extraction from the tube. Mechanical suspension using large diameter wheels (480) is used where speed is below 300 mph as a cost saving measure. At 200 mph a 3000 lb. capsule requires less than 2 horse power to maintain speed against the rolling resistance.

Mechanical acceleration devices (520) can be used. Traction fly wheels (522) communicating between opposite tubes (200) act as brakes, energy input and storage, and accelerators. To minimize losses the wheel (522) has a tapered driving edge (526) that acts against a tapered and slanted groove (530) on the capsule (300). The taper and slant of the groove match the tapered driving edge (526) of the drive wheel (522) such that the peripheral speed of the contact area of the wheel (522) matches the capsule speed as the capsule (300) undergoes acceleration or deceleration. As the capsule (300) accelerates progressive diameter and speed changes of the drive wheels (522) keep the acceleration consistent. Effective gear ratio changes as the capsule is accelerated or decelerated thus minimizing slippage and jerks as the capsule travels through the powering wheels (522). The per person energy usage is less than 1/10 of a conventional train, because the dead weight per person is less than one third, and aerodynamic drag is substantially eliminated. Such a system could replace existing subways and light rail at equivalent or lower initial expense. As a direct replacement the advantages are energy savings of 90%, and double the speed and capacity. Existing airports, with modification, could be utilized as ETT terminals.

Since electrical energy is used, power requirements could be supplied by photovoltaic cells, wind turbines, or hydroelectric generation integrated into the tube route. The right of way expense is fully utilized by exploiting it for its solar or wind power generating potential. During periods of high energy production the system operates at a high speed. The collective average mass and velocity of the entire system act as an energy storage device. As the maximum speed is reached more capsules with ballast are added to the system, this results in energy storage to absorb excess production of energy. As energy production of the prime power source diminishes the excess energy stored as extra ballasted capsules moving at high speed is used. As the capsules are decelerated, the result is like a giant linear flywheel to moderate energy production.

The ETT can the place of high tension power lines for the transport of electricity. The electrical energy produced is used to accelerate capsules laden with hot water (or other cargo) from the generating station. As the heavy capsules are decelerated after coasting along way they convert the energy back into electricity, the empty capsules are sent back to the generating station. Some of the empty capsules are used to send combustible tires or trash for incineration and cogeneration of additional electricity. In coastal areas the power plant desalinates water to be sent in the capsules. The equivalent water line cost is also deducted from the cost of the system. The difference in kinetic energy of the full loaded capsules verses the empty capsules equals the energy transported without power lines. The cost of the power lines (about a half million dollars per mile per circuit) is eliminated, this helps offsets the cost of tube construction. The fresh water sent is heated to about 200 degrees F. some of the waste heat generated by accelerating and decelerating the capsules heats the water to 212 by the time it arrives. Dumping the waste heat at a 120 deg. F. higher temp. results in a decrease in thermal-electrical efficiency of about 12% to 20%. The decrease is way more than made up for by selling the waste heat at the rate of the energy in the water that is as much as 80% of the heat released from burning the fuel. This effectively doubles the thermal efficiency. Estimates show that a 1000 MW plant operating at 30% efficiency could supply 3000 gallons of hot water per second. The hot water is placed in insulated capsules at the plant and accelerated to about 960 miles per hour in the evacuated tube, using the full electrical output of the plant. The hot water supplies the needs of about 2.5 million people at 100 gal./day each and 9 kW hr of electricity per day per person. Lower efficiency plants produce more hot water but move it at lower speed. Higher efficiency plants produce less water at higher peak tube velocity. The hot water is distributed for use in the insulated capsules. The capsules remain in an evacuated location to minimize heat loss until it is used. This provides energy storage. The Water is used to supply heat in winter as it is cooled for uses of cooler water. Sewage and garbage are placed in containers for the purpose and sent to processing centers. Methane gas produced at the sewage plants is put in the empty capsules sent to the power plant where it is burned for its energy. The cost of water and sewer lines is avoided and helps offset the cost of the ETT system. The overall utility cost to consumers remains the same or is reduced. The benefit is the drastically reduced cost and increased speed of transportation.

The cost per mile for long routes is lower because the terminal per mile cost is lower. For a low speed ETT (250 MPH) between existing terminals the cost of ETT is no greater than a toll expressway of the same capacity. The fare is equal to the equivalent toll (5–6 c/mile) saving the customer the Average of $0.22 per mile (vehicle expense) at a speed 4 times faster. The terminal to terminal time is less than airline TT flight time for distances less than about 200 miles.

Inner city subway systems can be replaced with a low tech ETT operating continuously at twice the capacity at half the expense fully contained within the existing system. The advantage of such a system being that the tube remains secure at all times, the service is continuous, greater safety, less opportunity for crime.

Under sea construction is the most challenging and expensive venture. All of the challenges of land construction are amplified and escape provisions complicated. The use of standard pipe line laying techniques will have to be expanded. The forces of water currents are very strong. Pressure at great depths is tremendous. Underwater construction is used in oil production now. As depth increases so does pressure. The tube must be thick enough to withstand the continuous pressure. The buoyancy of the tube is utilized to suspend the tube off the bottom with mooring cables. The tube is suspended deep enough to avoid wave action and passing surface traffic. Mooring cables restrict vertical and lateral movements of the tube. The tube and cables employ hydrodynamically efficient fairing to minimize the stresses due to water currents. The fairing weathervanes in response to current, thus minimizing hydrodynamic drag at all times. Alignment is maintained by adjusting the length of the mooring cable attach fittings. Non corroding materials are used throughout.

As ETT use is adopted and the new industry matures, terminal location will shift from centralized, to decentralized, to limited access, to general access. Eventually all residences and business that now have ground vehicle access can have ETT access.

System embodiments depend on the following (as will be apparent to those versed in the art): Suspension and powering means can include; mechanical, electromechanical, magnetic, electromagnetic. Access to the tube can be limited to ends only or accessible by merge or division tubes. Capsules can be optimized for liquid, solid or gaseous cargo, or to transport other vehicles, or containers. The life support used depends on; distance considerations, cooling capacity, life support time, comfort level desired, etc. Loading and unloading of the capsule can take place in tube with transfer fittings, or out of tube. The capsules can be removed from the tube using an airlock, or a dynamic seal and end to end packing. Loading and unloading can take place in a batch process in multiple parallel bays, with the capsules remaining in the tube. The capsules can be switched and turned around by shuttles, roundhouses, sidings or loops. The tube can be buried, suspended, elevated, or simply supported along its length or at intervals.

CONCLUSION, RAMIFICATION, AND SCOPE

The Evacuated Tube Transport (ETT) system is a method of transport comprising: a) a means of excluding air and other impediments to travel from a predetermined path, b) A means of continuously conducting objects or beings along said path. Such that energy usage in minimized and safety and speed maximized to the greatest extent. Many possibilities For the implementation for this transport are possible within the scope of this invention.

Prevalent usage of ETT is assured because of the quantum increase in efficiency, safety, and ecology of the system. Initially use will be restricted along established, major routs of travel (where demand is great). The construction cost is lowest where the terrain is flat, and geological activity is low. The initial preferred embodiment therefore address these needs. Later preferred embodiments will differ accordingly within the scope of this invention.

Eventually all major travel routs will be served with ETT service. As communities are planned tubes will be put in place for local or even residential service. With ETT it is possible to have high speed, continuous, efficient transport service to any desired location. With eventual service to any location. Retrofitting of local service is possible above or below existing streets, or along existing utility and transportation rite of ways. When motor vehicles are eventually replaced, unused local streets can be used for pedestrian traffic or recreational activities. Local travel is directed to local terminals at low speed (less than 300 mph). Local terminals are connected to commuter terminals at moderate speed (300 to 700 MPH). Commuter traffic is directed to adjacent commuter terminals or to the nearest major terminal at high speed (700 to 5000 MPH). Major terminal traffic is directed to Adjacent commuter, major or the closest international terminal. As this method is adopted every civilized home and business will be served with ETT.

The shift to ETT utilization can take place in a generation or less; witness the telephone, electrical power, running water, central sewers, gas pipes, air transport. All have happened within the lives of our grandparents. The quantum improvement that the railroads exhibited over horse and buggy is nothing compared to the improvement ETT has over current methods. The widespread use of ETT will enable an improved lifestyle for all inhabitants of the world. Lets use the limited fuel that we now have to construct a durable, safe, fast, clean transportation system that will serve many generations.

I claim:

1. A tubular transportation system for transporting passengers/cargos, comprising:
   a plurality of substantially evacuated tubes arranged along predetermined routes;
   a plurality of capsules accommodating passengers/cargos received in said tubes for traveling along said predetermined routes, each said capsule including a cylindrical capsule hull having at least an opened end for slidably receiving a passenger/cargo module, said module including life supporting equipment, and heat exchanging means for providing comfort to passengers on board; and a plurality of terminal stations for loading and unloading said capsules, each said terminal station having means for receiving an in-coming capsule from in-coming one of said tubes, withdrawing said module from said capsule hull so as to allow loading/unloading passengers/cargos, inserting said module into said capsule hull, and moving said capsule to an out-going one of said tubes.

2. The tubular transportation system of claim 1, wherein said capsules are provided with rolling means for guiding said capsules along said tubes.

3. The tubular transportation system of claim 1, wherein said terminal stations are provided with means for inserting/receiving said capsules from said tubes in a manner to maintain vacuum in said tubes.

4. A method of transporting passengers/cargos comprising steps of:

arranging a plurality of substantially evacuated tubes along predetermined routes;

providing a plurality of capsules for accommodating passengers/cargos for transporting passengers/cargos along said predetermined routes, wherein said step of providing further includes steps of providing a cylindrical capsule hull with at least an opened end, providing a passenger/cargo module adapted to be slidably received in said capsule hull, and providing life supporting equipment and heat exchanging means on said module for providing comfort to passengers on board; and arranging a plurality of terminal stations at predetermined locations along said routes for loading and unloading said capsules, and providing, at said terminal stations, means for receiving an in-coming capsule from an incoming one of said tubes, withdrawing said module from said capsule hull so as to allow loading/unloading of passengers/cargos, inserting said module into said capsule hull, and moving said capsule to an out-going one of said tubes.

5. The method of claim 4, comprising a further step of providing rolling means on said capsules for guiding said capsules along said tubes.

6. The method of claim 4, comprising a further step of providing means for inserting/receiving said capsules from said tubes in a manner to maintain vacuum in said tubes.

* * * * *